US011714435B2

(12) United States Patent
 Carter

(10) Patent No.: US 11,714,435 B2
(45) Date of Patent: *Aug. 1, 2023

(54) MULTI-FUNCTION THREE-STAGE PRESSURE REGULATOR

(71) Applicant: BAYOTECH, INC., Albuquerque, NM (US)

(72) Inventor: Stephen A. Carter, Albuquerque, NM (US)

(73) Assignee: BAYOTECH, INC., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/749,946

(22) Filed: May 20, 2022

(65) Prior Publication Data

US 2022/0382302 A1 Dec. 1, 2022

Related U.S. Application Data

(63) Continuation of application No. 17/316,320, filed on May 10, 2021, now Pat. No. 11,372,431.

(51) Int. Cl.
 *G05D 16/10* (2006.01)
 *G05D 16/04* (2006.01)
 (Continued)

(52) U.S. Cl.
 CPC ......... *G05D 16/101* (2019.01); *F16K 17/003* (2013.01); *F16K 17/38* (2013.01); *G05D 16/0402* (2019.01); *G05D 16/0404* (2019.01); *G05D 16/10* (2013.01); *Y10T 137/7795* (2015.04)

(58) Field of Classification Search
 CPC ............ Y10T 137/7795; G05D 16/101; G05D 16/0402; G05D 16/10; G05D 16/0404; F16K 17/003; F16K 17/38
 See application file for complete search history.

(56) References Cited

U.S. PATENT DOCUMENTS 1,731,519 A   10/1929  Bastian
3,083,721 A *  4/1963  Matthews ............ G05D 7/0106
                                                137/599.09

(Continued)

FOREIGN PATENT DOCUMENTS

EP        0908807       4/1999

OTHER PUBLICATIONS

Extended European Search Report in European Appln. No. 22172640.9, dated Oct. 14, 2022, 7 pages.

(Continued)

*Primary Examiner* — Jessica Cahill
(74) *Attorney, Agent, or Firm* — Fish & Richardson P.C.

(57) ABSTRACT

An integrated pressure regulator is provided with three stages configured to reduce an extreme tank pressure down to a typical working pressure. The regulator is configured to supply a steady working pressure until the tank pressure is reduced to little more than the working pressure itself. Stages of the pressure regulator are integrated into a body and arranged to minimize regulator mass and volume. A thermally-triggered pressure relief device may be included with a triggering time adapted to enhance the safety of smaller cylinders that may be used, e.g., in aerial applications.

18 Claims, 19 Drawing Sheets

(51) Int. Cl.
  *F16K 17/38* (2006.01)
  *F16K 17/00* (2006.01)

(56) References Cited

U.S. PATENT DOCUMENTS

| | | | | |
|---|---|---|---|---|
| 3,132,485 | A | * | 5/1964 | Watson .................. F15B 11/22 91/518 |
| 3,576,194 | A | | 4/1971 | Christensen |
| 3,630,234 | A | | 12/1971 | Hoffman |
| 4,384,703 | A | * | 5/1983 | Ruyak .................. F16K 31/088 137/556.6 |
| 4,799,511 | A | | 1/1989 | Azimov |
| 4,817,663 | A | * | 4/1989 | McAndrew ........... F16K 5/0647 251/293 |
| 4,909,278 | A | | 3/1990 | Ray |
| 5,456,281 | A | | 10/1995 | Teay |
| 5,520,206 | A | * | 5/1996 | Deville .............. G05D 16/0402 137/487 |
| 5,598,869 | A | * | 2/1997 | Nelson ............... G05D 16/0404 137/557 |
| 5,725,364 | A | * | 3/1998 | Mirazita ................. F04B 53/00 200/82 C |
| 5,755,254 | A | | 5/1998 | Carter et al. |
| 5,890,483 | A | | 4/1999 | Stevenson et al. |
| 5,890,543 | A | | 4/1999 | Job |
| 5,996,625 | A | | 12/1999 | Collado et al. |
| 6,173,735 | B1 | | 1/2001 | Perry, Jr. et al. |
| 7,971,798 | B2 | * | 7/2011 | Pechtold .............. G05D 23/125 137/457 |
| 8,656,945 | B2 | | 2/2014 | Nicolini et al. |
| 9,897,257 | B2 | | 2/2018 | Despres et al. |
| 10,100,981 | B2 | | 10/2018 | Borghesani et al. |
| 2002/0170598 | A1 | | 11/2002 | Girard et al. |
| 2004/0020537 | A1 | | 2/2004 | Girouard |
| 2006/0260692 | A1 | | 11/2006 | Pechtold |
| 2009/0301581 | A1 | * | 12/2009 | MacNeal ................ F16K 1/306 137/530 |
| 2012/0090718 | A1 | * | 4/2012 | Kawasetsu ............. F04F 13/00 138/30 |
| 2012/0222749 | A1 | | 9/2012 | Hurst |
| 2013/0008542 | A1 | * | 1/2013 | Irwin .................... F16K 37/005 137/859 |
| 2013/0206242 | A1 | | 8/2013 | Hurst |
| 2014/0007953 | A1 | | 1/2014 | Kirchner et al. |
| 2015/0226343 | A1 | * | 8/2015 | Jenks ................. F16K 11/0873 137/625.46 |
| 2021/0089062 | A1 | * | 3/2021 | Thompson ........... G05D 16/107 |

OTHER PUBLICATIONS

VTI PRD Tank End Plug_American CNG website, downloaded Apr. 21, 2021, 2 pages.
PRD28 Two-Stage Manifold Mount Regulator—Beswick Engineering website, downloaded Apr. 21, 2021, 2 pages.
PCT International Search Report and Written Opinion in International Appln. No. PCT/US2022/028483, dated Oct. 25, 2022, 14 pages.

* cited by examiner

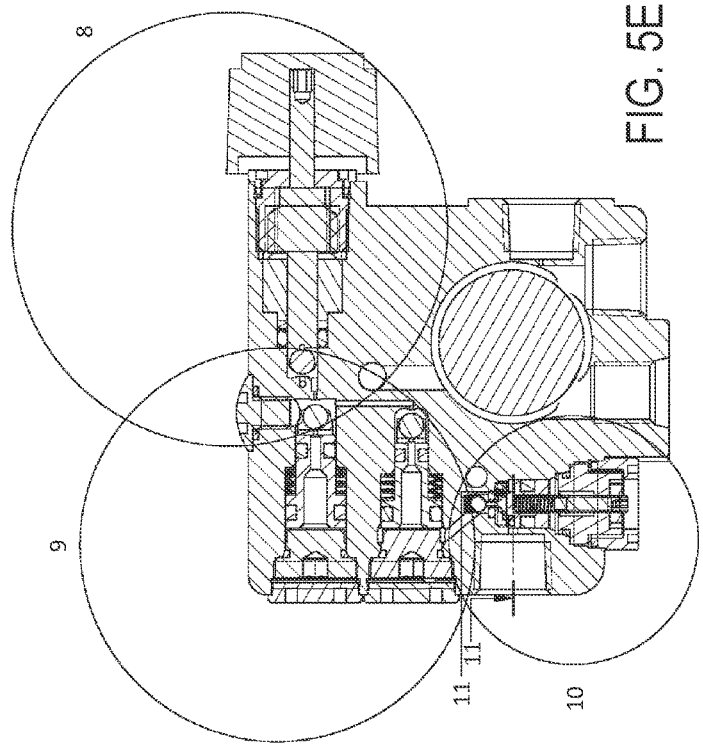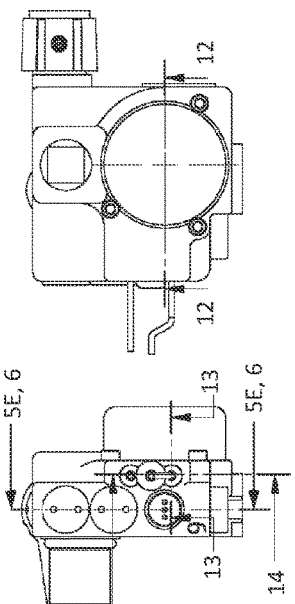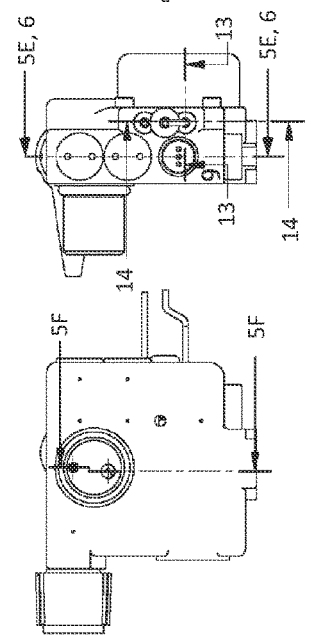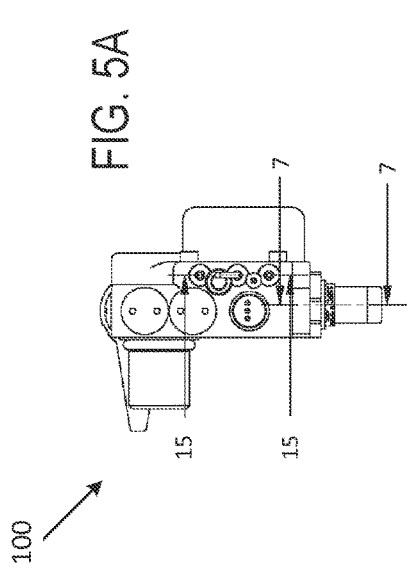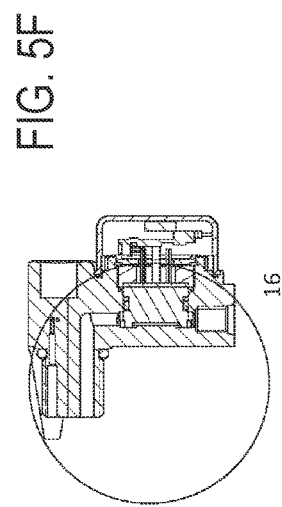

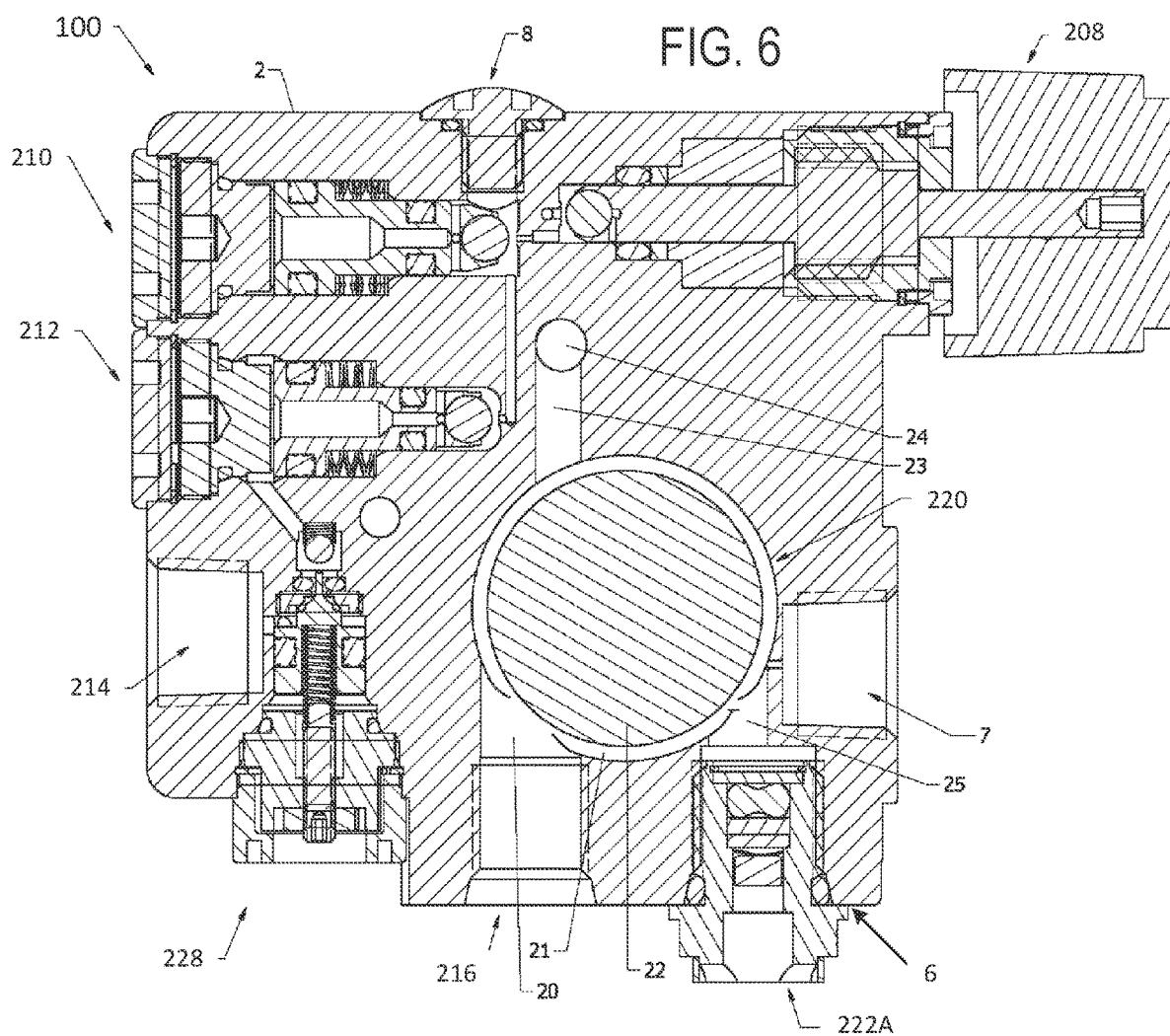

MULTI-FUNCTION THREE-STAGE PRESSURE REGULATOR

CROSS-REFERENCE TO RELATED APPLICATION

This application claims the benefit of priority to U.S. application Ser. No. 17/316,320, filed on May 10, 2021, the contents of which is hereby incorporated by reference.

BACKGROUND

There is increasing interest in hydrogen fuel-cell powered airborne drones for commercial and military uses as well as other hydrogen fuel-cell based power systems. There is also interest in fuel cells to provide back-up electrical power for cell phone towers. For both uses, gas is stored in tanks at pressures up to 6,000 psi (414 bar).

Drones, in particular, need a lightweight regulator to maximize range, run-time, loiter time and cargo capacity. Power demand is in the range of 0.1-3.0 kW. Full power should be available until the cylinder is almost empty. Thus, while inlet pressures may range from 50 to 6,000 psi, outlet pressure should be finely adjustable (e.g. from 10-20 psi).

One and two stage regulators exist, but stages must be ganged together to achieve the flow and input-pressure range. Other parts would then also need to be ganged together to achieve peripheral functions, such as: cylinder isolation, pressure readings, and pressure relief. The result would be an unwieldly, heavy assembly with reliability issues due to the number of joints and potential leak-sites.

Thus, what is needed is an integrated pressure regulator that provides the required pressure regulation and peripheral functions in a unit that is reliable enough and light enough to be suitable for high-demand environments.

SUMMARY

In an embodiment, a regulator valve combines all the required functions into a single, compact, rectangular body that only occupies a small space close to the tank neck. The flow capacity and input range are achieved by using three stages of regulation in series. The integration of peripheral devices reduces the overall footprint, mass and number of potential leaks sites. A primarily aluminum construction further reduces mass. Crest-to-crest wave-springs in regulator stages one and two reduce the spring height by 50%, further reducing body size and weight.

The embodiment results in a very small product. Several components are so small as to be difficult to handle or install (e.g., 0.078" and 0.127" ball seals, -002 O-ring). In the embodiment, the overall frontal footprint is approximately half the size of a business card with a mass of approximately 175 grams. Of that mass, perhaps 40% is attributable to the critical pressure-sensing function.

In an embodiment, a high flow filling port and filling circuit provide for fast filling of the cylinder. A gauge port accepts a pressure gauge or other auxiliary device. The tank is protected from over pressure. Where thermal events are a possibility, the invention includes a new, high flow, ultra-fast thermobulb PRD. For other applications a burst disc PRD may be substituted.

In an embodiment, a high-flow manual valve uses a plastic ball-seal. Very coarse threads provide open/close travel in a quarter turn. The manual valve may be turned by a knob/lever, or an Allen wrench if the knob is omitted. The valve offers rapid actuation and a clear visual indication of whether the valve is opened or closed.

In an embodiment, the regulator stages use piston-style regulators to minimize size and maximize over-pressure tolerance. All stages use balls for their flow seals. Stages one and two are fixed; stage three is adjustable. Stages one and two use crest-to crest wave-springs to reduce piston lengths, reducing size and mass. The two dynamic seals in each of the first and second stages are multi-lobed seals, which reduces friction, enhances sealing and extends life, versus the O-ring seals seen in typical commercial units. Lower friction allows smaller pistons and thus reduced size/mass.

In an embodiment, a third regulator stage uses a 2 mm stainless steel ball seating against a -002 O-ring for flow control. A novel series of scallops or indentations on the face of the third stage piston ensures full flow even if the piston hits its full flow stop.

In an embodiment, a port on the first stage outlet may be hold either a ball and spring style relief valve or be plugged. The relief valve option protects against regulator over pressure.

In an embodiment, a regulator valve embeds a high-pressure transducer into the valve body. The output is via a pigtail wiring harness. The embodiment accommodates a relatively large pressure transducer and signal conditioner printed circuit board (PCB). As smaller sensors and PCBs become economical, adjustments to the design dimensions may be made to accommodate the smaller sizes, which would further reduce size and mass. If a pressure transducer is not needed, the port may be plugged or omitted, reducing size and mass.

In an embodiment, the pressure transducer is O-ring sealed. An environmental cover shields the sensor/PCB from the elements and from impact abuse. The output wires are also environmentally sealed. However, O-rings permeate at high pressure. So, hydrogen will accumulate over time inside the sensor's environmental cover. In the embodiment, a compact, internal pressure relief valve vents accumulated gas at a low-pressure value to avoid unsafe conditions.

An embodiment is directed to reducing the potential for tampering, which is a significant concern at 6000 psi. Accordingly, all external fitments have tamper-resistant features and require special tools to remove. External features have very little exposed surface area to preclude gripping/turning parts with pliers or by other friction means.

In an embodiment, a regulator valve includes is a multi-function 3-stage pressure regulator that mounts on a high-pressure Hydrogen cylinder (tank). The compact, lightweight design reduces pressure from 50 to 6,000 psi to 10-20 psi. A quarter turn manual valve isolates the regulator from the cylinder. A pressure relief device (PRD) protects against thermal events. An integral high-pressure transducer supports fuel-gauge calculations. The high flow rate of the embodiment may support fuel cells up to 3 kW for applications such as drones and cellphone towers. The features of such a regulator valve may include: a stud to mate with a high-pressure tank; a drive socket for torquing the valve; a quarter turn manual valve to isolate the regulator from the tank; a high-pressure transducer for fuel gauge purposes; a high-pressure relief valve (thermal or pressure); a low-pressure relief valve; a pressure-gauge port; a fill port; an outlet port; and first, second, and third pressure regulator stages in series, with each having a piston-type regulator and where the third stage regulated pressure is adjustable. In an embodiment, a first stage may be calibrated to nominally supply 150-300 psi from a 6,000 psi source, a second stage may be calibrated to nominally supply 50 to 125 psi from the first stage regulated pressure, and a third stage may be calibrated to nominally supply 10 to 20 psi from the second stage regulated pressure.

BRIEF DESCRIPTION OF THE DRAWINGS

The embodiments are illustrated by way of example and not limitation in the accompanying drawings, in which like references indicate similar elements, and in which:

FIG. 5A and FIG. 5B are left views of the embodiment of the three-stage pressure relief valve of FIG. 1;

FIG. 5C is a front view of the embodiment of the three-stage pressure relief valve of FIG. 1;

FIG. 5D is a rear view of an embodiment of the three-stage pressure relief valve of FIG. 1;

FIG. 5E is a cross-sectional view of the section indicated in FIG. 5B of the embodiment of the three-stage pressure relief valve of FIG. 1;

FIG. 5F is a cross-sectional view of the section indicated in FIG. 5D of the embodiment of the three-stage pressure relief valve of FIG. 1

FIG. 6 is a cross-sectional view of the section indicated in FIG. 5B;

DETAILED DESCRIPTION

FIG. 1A and FIG. 1B illustrate of an embodiment of a three-stage pressure regulator valve 100 in a use case— attached to a tank 102 with a length 104 and a diameter 106. To provide context on the size attained due to the numerous innovations within regulator valve 100, diameter 106 is 4.0 inches and length 104 is 17.0 inches, corresponding to a 2.8 L tank. FIG. 1A and FIG. 1B illustrate a benefit of an embodiment of regulator valve 100 associated with integration—the reduction in size. Where regulator valve 100 appears relatively proportional with regard to the 2.8 L tank 102, should the tank be reduced in size, perhaps to 1.5 L, regulator valve 100 would appear considerably larger, proportionally. However, even then, regulator valve 100 would be far preferable to a ganged assembly of unintegrated components that provided the features of regulator valve 100.

Figure 1:
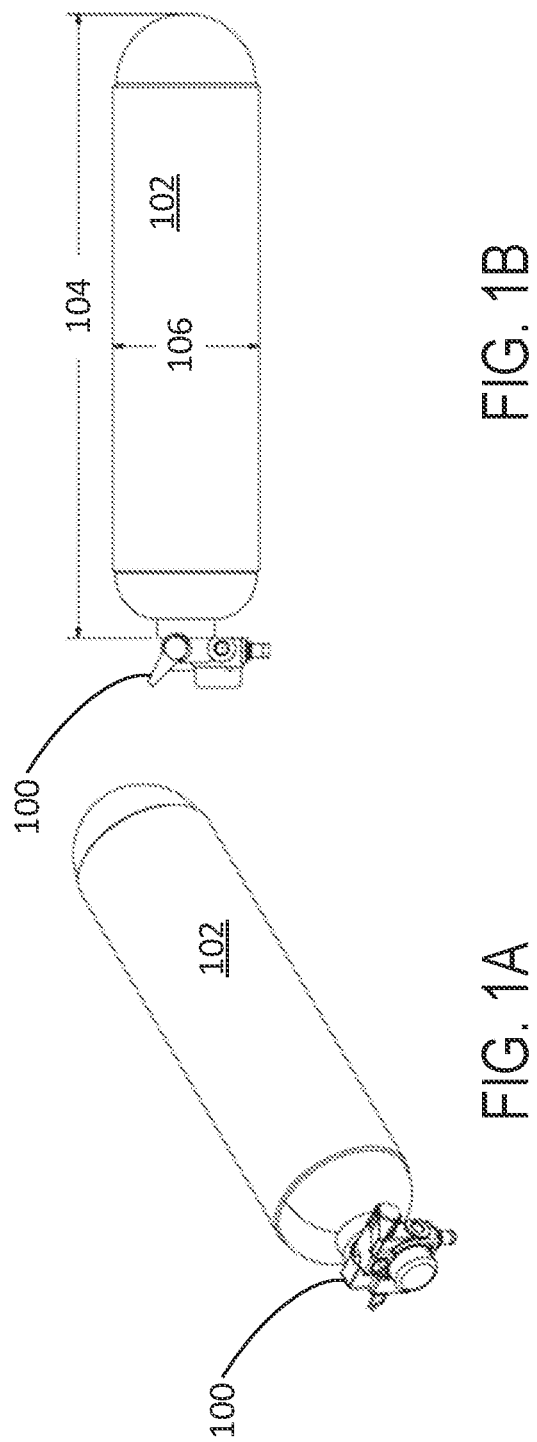
FIG. 1A is an isometric view of an embodiment of a three-stage pressure regulator in a use case.
FIG. 1B is a side view of the embodiment of the use case of FIG. 1A.
Figure 2:
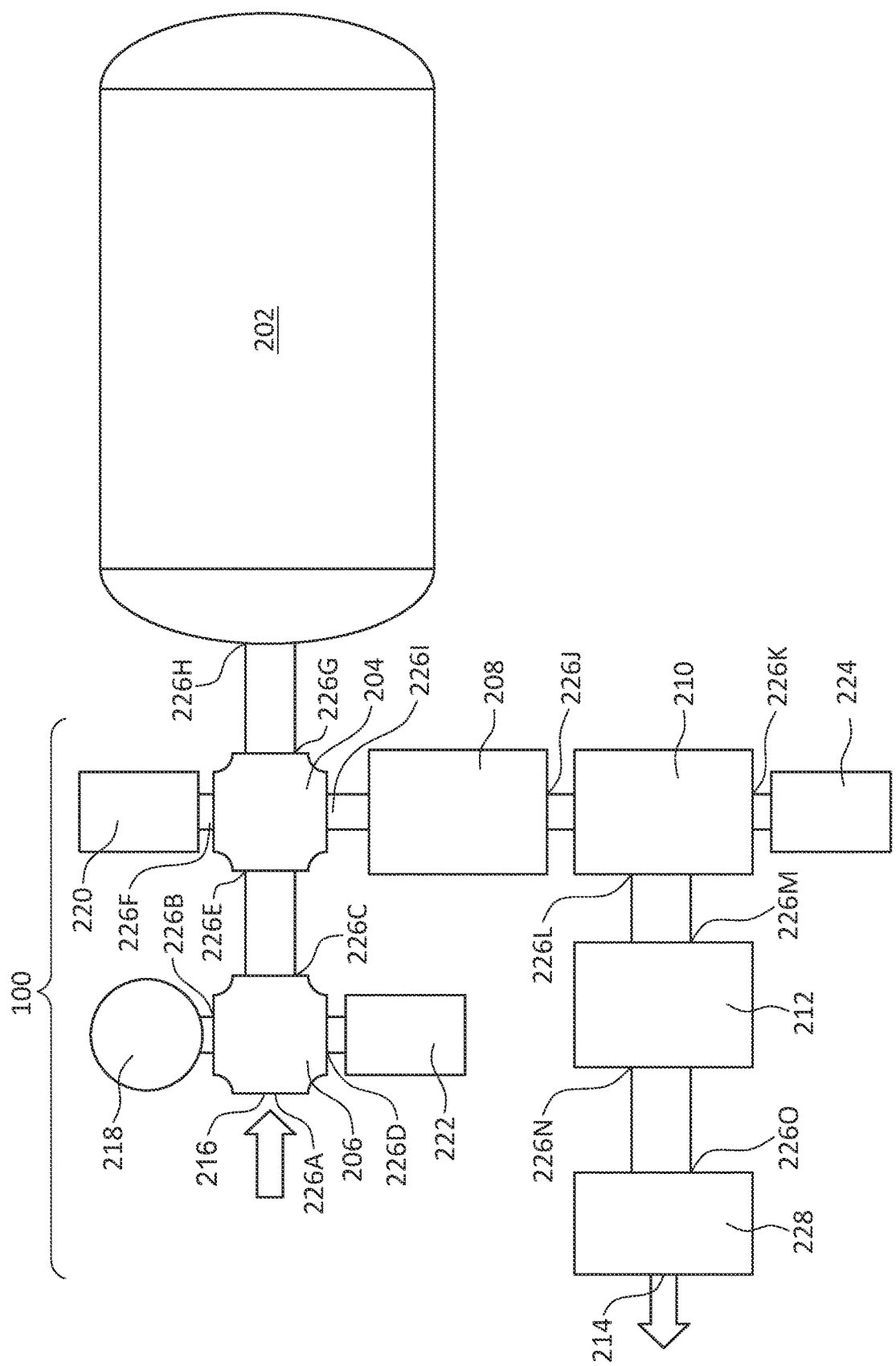
FIG. 2 is a schematic diagram of an embodiment of a three-stage pressure regulator.

FIG. 2 is a schematic diagram of the embodiment of the three-stage pressure regulator of FIG. 1. FIG. 2 is not to scale in illustrating the features of regulator valve 100. In FIG. 2, the embodiment of regulator valve 100 includes a manual valve 208, a first regulator stage 210, a second regulator stage 212, a third regulator stage 228, a high pressure gauge 218, a pressure sensor 220, a pressure relief device (PRD) 222, and a low-pressure pressure relief valve (PRV) 224. An inlet connection 216 may be used to fill a high pressure tank 202. An outlet connection 214 may be used to supply regulated gas from tank 202. For illustration of the benefits of integration, FIG. 2 includes two high pressure cross-connections 204, 206 and connections 226A . . . 226O, which may be necessary if the components of FIG. 2 were assembled separately. Each of connections 226A . . . 226O provides a potential leak path—a total of fifteen potential leaks. As will be seen, in the integrated embodiments of FIG. 1 and FIG. 3-FIG. 21, the number of potential leak paths is greatly reduced to seven.

In the embodiment of FIG. 2, manual valve 208 allows regulator stages 210, 212, 228 to be isolated from tank pressure. Pressure regulator stages 210, 212, 228 supply to outlet 214 a regulated pressure of from 10-20 psi from a tank pressure of from 50 to 6,000 psi. For example, in an embodiment, first stage 210 may be calibrated to nominally supply 150-300 psi from tank 202 pressure, second stage 212 may be calibrated to nominally supply 50 to 125 psi from first stage 210 pressure, and third stage 228 may be calibrated to nominally supply the final 10 to 20 psi to outlet 214 from second stage 212 pressure. High pressure gauge 218 provides for determining tank pressure at the valve. Pressure sensor 220 senses tank pressure for fuel gauge/range/remaining on-time purposes, the output of which may be supplied to instrumentation. Pressure relief device (PRD) 222 protects the tank from over pressure in the event of a thermal event. Pressure relief valve (PRV) 224 protects the regulator.

Thus, embodiment of regulator valve 100 provide the following advantages: feature integration; a faster response time (in both pressure regulation and PRD 222); greater low-flow output; enhanced fire protection; a pressure transducer; a permeation vent (venting from protecting pressure sensor 220); low pressure relief protection of the regulators; a manual shut-off valve; enhanced packaging size and weight; an approximate 50% reduction in potential leak sites; a reduction in other failure sites; an elimination of component alignment issues; a torquing/installation feature; general tamper resistance; greater life expectancy and reliability; higher fill rate; reduced assembly time, and reduced overall cost.

The benefits of such integration should not be dismissed lightly. With the reduction of the fifteen potential leaks sites 226A . . . 226O to approximately seven in embodiments of regulator valve 100, there are 46% fewer potential leaks—which is a significant safety increase, particularly when considering that a gas in some envisioned uses has a 5%-95% flammability range.

Figure 3:
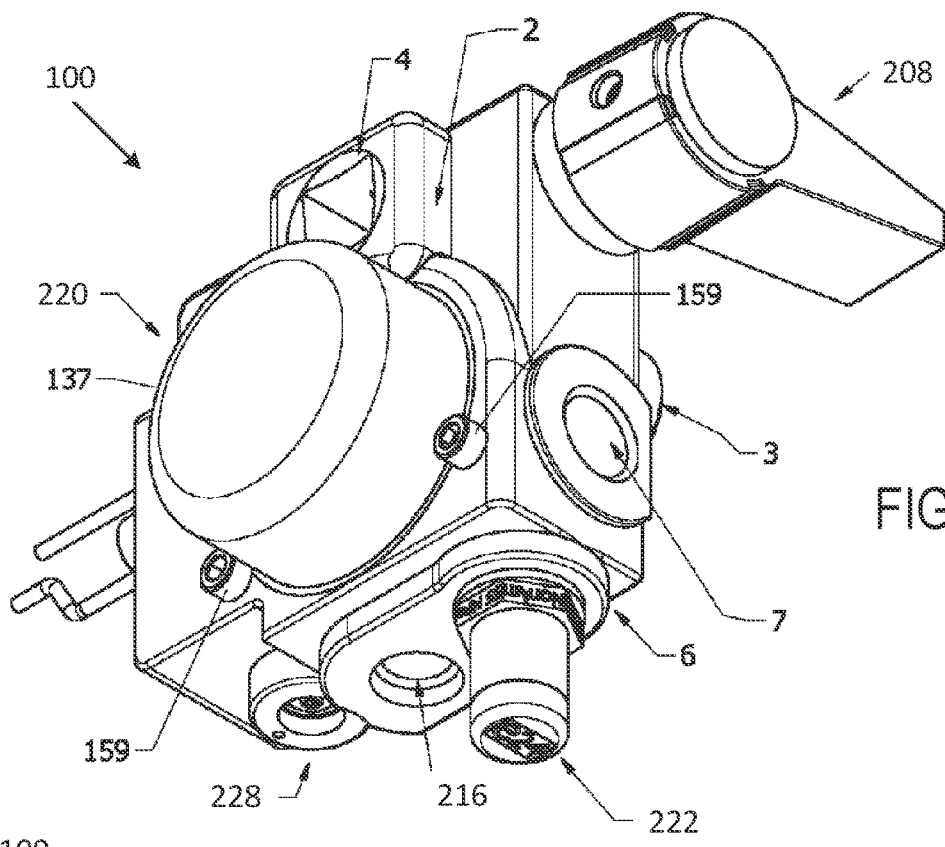
FIG. 3 is a lower front left isometric view of the embodiment of the three-stage pressure relief valve of FIG. 1.

FIG. 3 is an isometric view of an embodiment of three-stage pressure regulator valve 100. In embodiments, regulator stages 210, 212, 228 of three-stage regulator valve 100 are piston-type pressure regulators with first regulator stage 210 supplying second regulator stage 212 supplying third regulator stage 228, which feeds high flow outlet port 214. In FIG. 3, regulator valve 100 further includes: a body 2; a stud 3 for attaching the device to a tank cylinder neck; a ¼" square drive socket 4 for torquing the device into the cylinder neck; a high flow port 216 for fast filling of the tank; a second high flow port 6 provided with pressure relief device (PRD) 222; a low flow port 7 provided with pressure gauge 218; a moderately high flow port 8 (FIG. 4) may be plugged (as shown) or be populated with a ball and spring pressure relief valve 224 (akin to the ball and spring pressure relief device of FIG. 14) to protect the regulator.

In FIG. 3, integral pressure sensor 220 includes an environmental cover 137, which is secured by screws 159. Pressure sensor 220 may be a 3-wire type (e.g., 0-5 vdc output) or a 2-wire device (e.g., 4-20 m-amp). As shown in FIG. 3, two wires 142, 142*a* exit body 2 with suitable wire seals (discussed below). Screws 150, 150*a* retain the wire seals. Exit location 142*b* indicates where a third wire (if used in the optional 3-wire sensor configuration) exits from body 2.

In the embodiment, pressure sensor 220 is O-ring sealed. As O-rings permeate, permeation gas will accumulate over time inside environmental cover 137. A PRV of ball 155, spring 154, and cap 150 provides a pressure relief function to vents the accumulated gas at a low, safe pressure (discussed within with regard to FIG. 14).

Optionally, high flow port 6 may be populated with a burst disc or simply plugged, and low flow port 7 may be provided with an auxiliary device other than pressure gauge 218.

An obvious shortcoming of regulators in this market niche is the absence of any obvious means of safely torquing the devices into the cylinder necks. In an embodiment, drive socket 4 is a ⅜" square drive socket for the specific purpose of tightening the regulator into the cylinder neck. It also simplifies using a torque wrench to tighten the regulator to a specified torque.

Tampering with a pressure containing device at 5000 psi is a notable concern. In embodiments, parts that are holding pressure may be colored red as a visual warning that their removal is dangerous and would release gas. Additionally, regulator valve 100 includes five ports that have safety covers that require special tools to remove: manual valve 208; regulator stages 210, 212; and pressure sensor 220. The safety covers have left hand threads to further thwart tampering. If the covers are removed, there are still internal retaining rings preventing access to the pressure containing parts.

Figure 4:
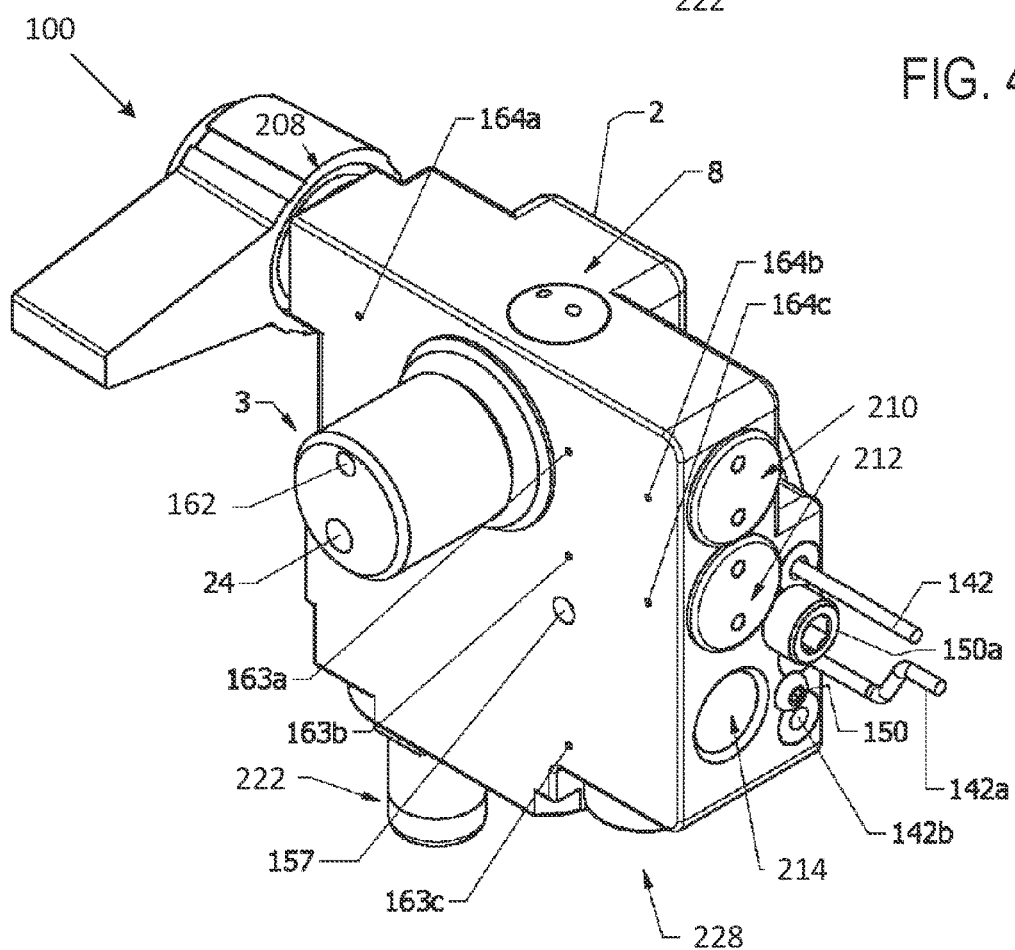
FIG. 4 is an upper rear right isometric view of the embodiment of the three-stage pressure relief valve of FIG. 1.

FIG. 4 is an upper rear right isometric view of three-stage pressure regulator valve 100. As shown in FIG. 4, the rear face of body 2 includes several small holes into the valve body's interior. Holes 163*a*, 163*b*, 163*c* provide atmospheric pressure as the reference pressure to the three regulator stages 210, 212, 228 of pressure regulation. Should any of the seals leak, these holes also allow leakage gas to escape. Hole 157 is the primary vent hole for the PRV 224 that vents permeation gas from pressure transducer cover 137. Hole 164*a* is a vent hole for the circuit of manual valve circuit 208 (discussed below). Holes 164*b*, 164*c* are vent holes for the piston retainers in first and second regulator stages 210, 212, respectively.

FIG. 5A is a right view of three-stage pressure regulator valve 100. FIG. 5A indicates the sections of three-stage pressure regulator valve 100 further illustrated in cross-sectional views in FIG. 7 and FIG. 15.

FIG. 5B is a right view of three-stage pressure regulator valve 100. FIG. 5B indicates the sections of three-stage pressure regulator valve 100 further illustrated in cross-sectional views in FIG. 5E, FIG. 6, FIG. 13, and FIG. 14.

FIG. 5C is a front view of three-stage pressure regulator valve 100. FIG. 5C indicates the section of three-stage pressure regulator valve 100 further illustrated in the cross-sectional view of FIG. 12.

FIG. 5D is a rear view of three-stage pressure regulator valve 100. FIG. 5D indicates the sections of three-stage pressure regulator valve 100 further illustrated in cross-sectional views in FIG. 5F.

FIG. 5E is a cross-sectional view of the section indicated in FIG. 5B of three-stage pressure regulator valve 100. FIG. 5E indicates the sections of three-stage pressure regulator valve 100 further illustrated in cross-sectional views in FIG. 8, FIG. 9, FIG. 10, and FIG. 11.

FIG. 5F is a cross-sectional view of the section indicated in FIG. 5D of three-stage pressure regulator valve 100. FIG. 5F indicates the sections of three-stage pressure regulator valve 100 further illustrated in cross-sectional views in FIG. 16.

FIG. 6 is an enlarged view of the cross-sectional view of FIG. 5E. FIG. 6 is a horizontal cross-section of valve 100 thru the center of regulator stages 210, 212, 228. Fill port 216 may be an appropriate form such as SAE J1926-2, ISO 6149-1 or NPT. As shown, it is an ISO 6149 M8×1 port (O-ring sealed). Fill port 216 includes an outlet passage 20, which connects to a sensor cavity 21, which contains a transducer 22 of pressure sensor 220. Another passage 23 is drilled thru port 216, connecting sensor cavity 21 to a bore 24 that empties into the tank interior, completing the fill-circuit (216-20-21-23-24). Port 6, populated with a thermal PRD 222A (different from PRD 222, FIG. 7), is connected to sensor cavity 21 by a high flow passage 25. Thus, there is a high flow circuit from the tank to port 6 (24-23-21-25-6). PRD port 6 may be of an appropriate form such as SAE J1926-2, ISO 6149-1 or NPT. As shown, it is an SAE J1926-⅜"-24 port (O-ring sealed).

A feature of regulator valve 100 is that the filling and withdrawal circuits are separate. So, each may be optimized for its function. Fast filling may have near-sonic velocities. Any contaminants in the fill gas could damage seal surface they might hit. Hence, separating the filling and withdrawal circuits enhances reliability. With fill-circuit (216-20-21-23-24), fill gas enters thru the fill port, flows thru an annular clearance cavity 21 around pressure sensor 22, then passes on to a second bore 23 that intersects bore 24 into the cylinder. Fill gas never impinges directly on the sensor seal. Cylinder pressure only reaches the sensor's seal set thru an annular gap of 5-15 microns. By adjusting the size of annular clearance cavity 21 around the sensor and the two intersecting drillings, the resistance of the filling circuit may be adjusted to any desired value. As shown, bores 23, 24 are 0.125" and 0.141", respectively. For comparison, the bore thru an M8 commercial fill fitting is 0.090" or approximately 52% of the capacity of fill circuit 216-20-21-23-24. In other words, a typical commercial fitting secured to inlet 216 during filling would restrict filling more than fill circuit 216-20-21-23-24. Thus, the embodiment supports extremely high filling rates. In the embodiment of FIG. 6, regulator 100 may be fitted with a check valve, e.g., a quick connect fitting with a check valve, at port 216 to prevent gas from escaping tank 102.

Figure 12:
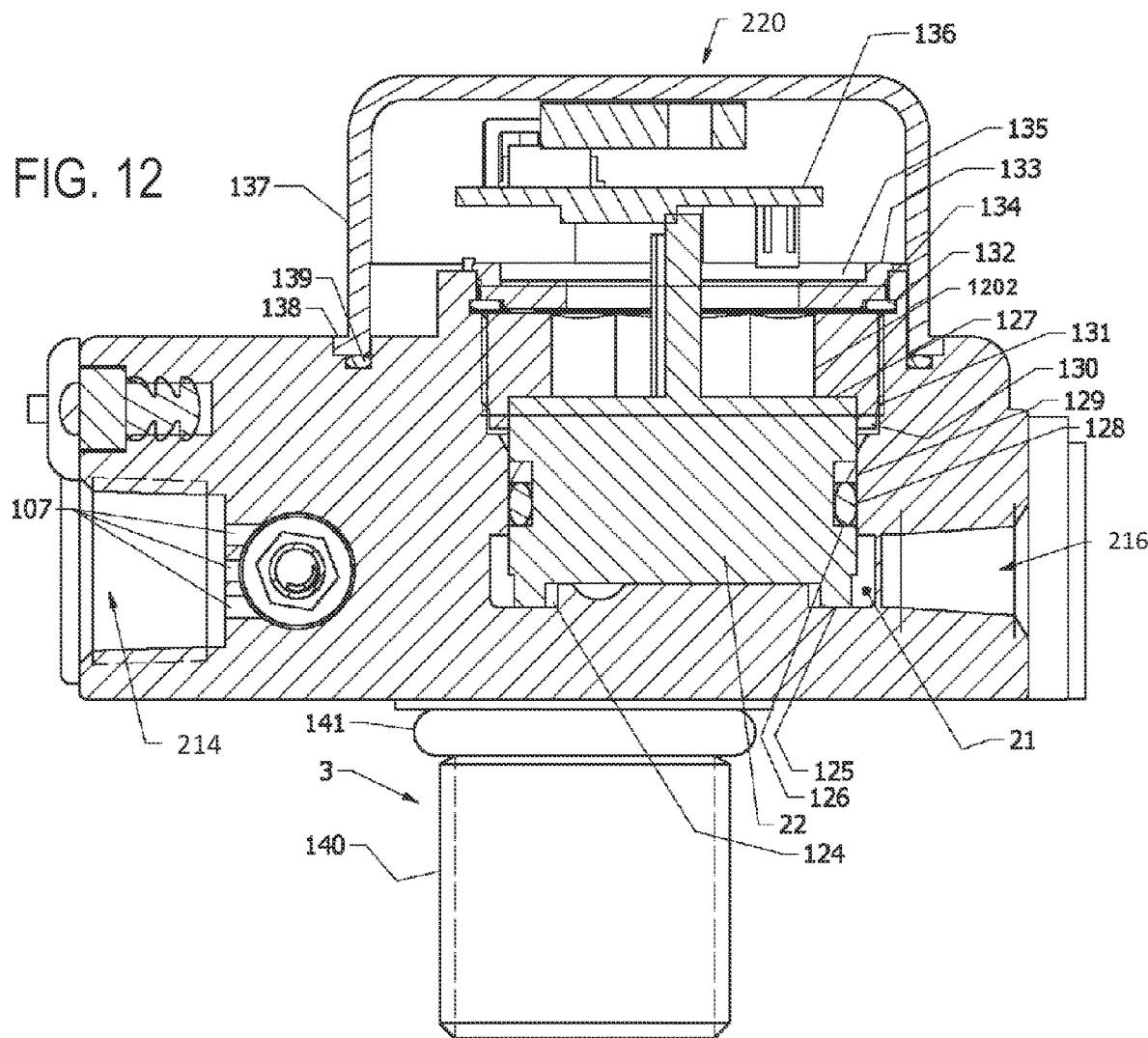
FIG. 12 is a cross-sectional view of the section indicated in FIG. 5C.
Figure 16:
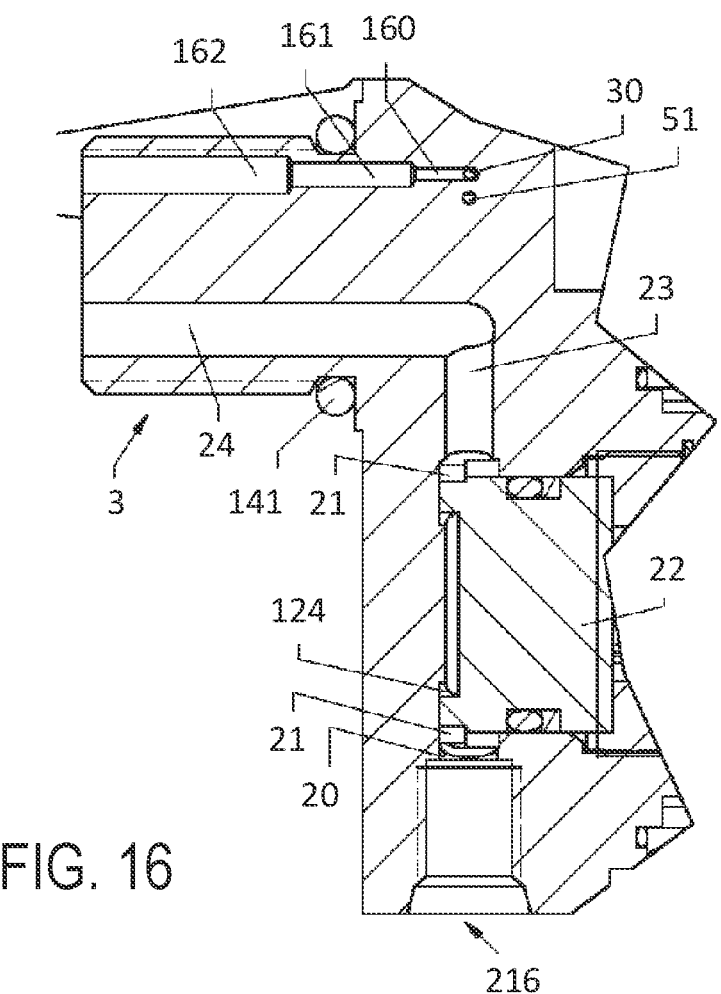
FIG. 16 is a cross-sectional view of the section indicated in FIG. 5F.

FIG. 16 is a cross-sectional view illustrating the section of three-stage pressure regulator valve 100 as shown in FIG. 5F. FIG. 16 is a vertical cross-section through the center of fill port 216. FIG. 12 illustrates the filling path 216-20-21-23-24 in another plane. A described above, fill gas enters port 216 and connects to sensor cavity 21 via connector passage 20. Transducer 22 is sealed to the cavity by an O-ring and back-up ring seal-set (128, 129, FIG. 21). Transducer 22 has a reduced OD at its base which resides in an enlarged annular cavity 21 creating a large annular flow space. That space is connected to the tank interior by passages 23, 24. Space 124 is pressure-sensor 220's sensing cavity and is in fluid communication with the pressure in sensor cavity 21. Stud 3 is used to mount the device to the tank neck. Stud 3 provides a second, independent flow path that connects tank pressure to the regulator sections. As shown the outlet passage that feeds regulator stage 210 is a 3-step bore 162, 161, 160 connecting tank pressure to inlet bore 30 of manual valve 208. Preferable, the final, smallest-diameter segment 160 is chosen to provide adequate flow area. However, it is impractical to drill such a small and long bore. Accordingly, the bore has three steps to limit each sector's L/D ration to approximately 10:1. It may be appreciated that bore 161's diameter and placement are selected to ensure a proper burst pressure at the thinnest section (i.e., near the gland for O-ring 141). A bore 51 connects the manual valve outlet and the first stage regulator 210's inlet (discussed below with regard to FIG. 8).

As shown, stud 3 is sealed to the tank neck by O-ring 141. Optionally, stud 3 may use dry-seal pipe threads (NPT) to affect a gas-tight seal. A feature of the embodiment is that stud 3 is intentionally off center from the valve head to optimize the placement and routing of internal passages. Another feature is the ability to use optional threads sizes for stud 3 to accommodate various high-pressure Hydrogen cylinders.

Figure 7:
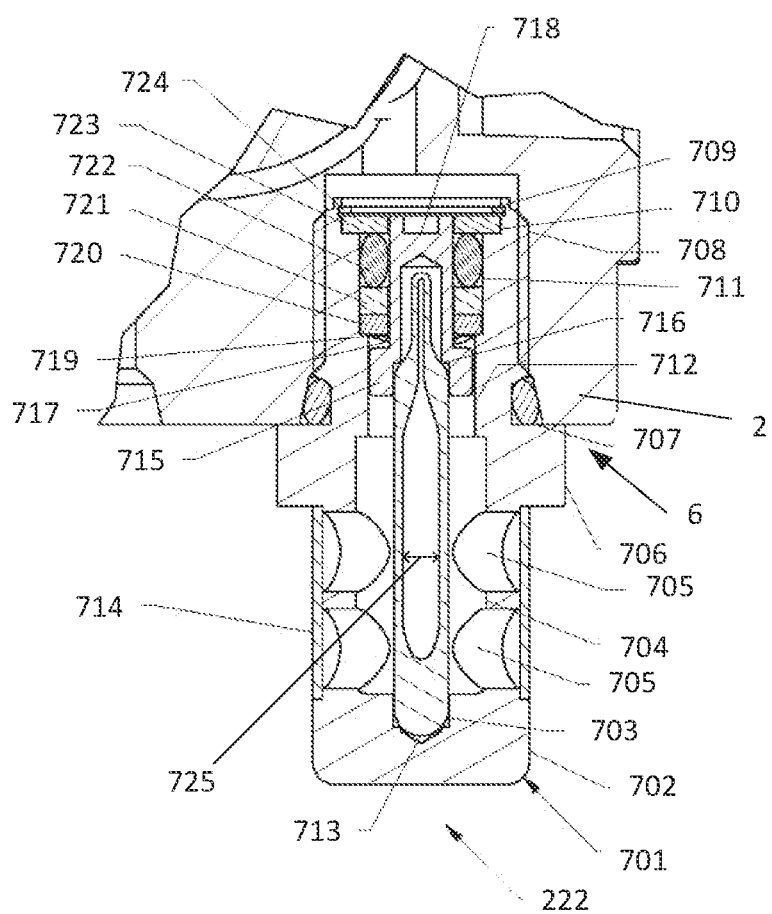
FIG. 7 is a cross-sectional view of the section indicated in FIG. 5A.

FIG. 7 is a cross-sectional view of the section indicated in FIG. 5A. FIG. 7 is a horizontal cross-section thru the center of port 6, parallel to the plane of regulator stages 210, 212, and localized to the area around the PRD 222. As discussed, PRD port 6 may be populated with a thermal PRD as shown in FIG. 7, a pressure activated PRD (i.e., burst disc), or be plugged (FIG. 6 shows a burst disc PRD version 222A). In the embodiment, PRD 222 includes eleven parts: a PRD housing 701; a port-seal O-ring 707; an internal retaining ring 724; an outer washer 723; a piston-sealing O-ring 722 and back-up ring 721; an inner washer 720; a piston 715; a thermobulb trigger element 713; a curved spring washer 719; and a heat shrink tube 714.

PRD housing 701 includes an outer, cylindrical bulkhead 702 with a stepped bore 703 against which the proximal end of thermobulb 713 seats. The diameter and edge profile of bore 703 is specified by the thermobulb manufacturer to utilize the maximum crush strength of the glass bulb. For the chosen thermobulb, the smaller bore has a sharp edge and a diameter of 1.80 mm. The larger diameter in 703 is chosen to provide clearance to the OD of thermobulb 713. The chosen thermobulb is very strong in compression (crush) with a minimum crush strength of 440 lb (i.e., an 8.8:1 crush safety factor at 350 bar).

In an embodiment, a specific thermobulb 713 is chosen for its small size (2.4 mm diameter×16 mm long) and exceptionally fast triggering characteristic—a Norbub N2.5XS. Thermobulb triggering response rates are quoted as a value RTIc [c=0.5(m/s)½]. This thermobulb's value is 25 (m/s)½. That compares to thermobulbs typically found in PRD's whose values are 65 (m/s)½. Thus, as a first approximation, this thermobulb would trigger in 38% of the time of "normal" thermobulbs (i.e., 25/65=0.38). Additionally, the PRD's aluminum construction, high surface to volume ratio and ultra-low mass (3.95 grams) makes this an exceptionally fast-response device.

The distal end of thermobulb 703 seats in piston 715 against a sharped edge bore 716. Bore 716 is also specified by the thermobulb manufacturer and is 1.80 mm. The depth of bore 716 is chosen to provide adequate clearance to the thermobulb's nib (capillary tip).

PRD piston 715 has three diametral features: a diameter of piston-head 715 is chosen so the piston will slide smoothly in bore 712, while limiting tilt; a sealing diameter 717 is chosen to provide the proper minor diameter of a rod-style gland using an SAE AS 568 O-ring 721 and back-up ring 722 seal-set. In this case, the seal set is a -005 size. Bore 711 in PRD housing 701 is chosen to create the outer gland diameter for this -005 ring set. In the embodiment, the tight tolerances and fine surface finishes on bore 711 and piston 715 are chosen to suit the 350 bar hydrogen environment.

Inner washer 720 seats against a companion face in the PRD housing and prevents O-ring extrusion at high pressure. In a preferred embodiment, washer 720 is a light press fit into the housing. The piston seal set 721, 722 seats against washer 720. The distal end of O-ring 722 is constrained by outer washer 723, which sits in PRD housing bore 710 and provides the fourth side of the gland. An internal retaining ring 724 sits in a gland 709 in the PRD housing and retains washer 723. PRD 222 is attached to valve body 2 via threads 708 (⅜"-24 as shown) and is torqued into body 2 by a hex 706 on the housing. The PRD housing is sealed to body 2 by O-ring 707 (SAE AS 568-903 as shown). The gland boundaries for O-ring 707 are created by the PRD housing and valve body.

PRD housing 701 has two pairs of two oval vent slots 705 spaced 180° apart. An optional heat shrink tube 714 covers the holes to keep out contaminants. As shown in FIG. 7, PRD 222 is in its normal state. Gas pressure against seal set 721, 722 forces the piston against the thermobulb with a force of 50 lbs at 350 bar. If thermobulb 713 reaches its trigger point (110° C.), it shatters violently into small shards, releasing the piston at high velocity. The piston accelerates towards the end bulkhead 702, shoving the glass shards into the open volume defined by the PRD housing's enlarged inner bore 704. Gas pressure ruptures the heat shrink tube 714 (if installed) and gas escapes thru the slots 705. PRD port 6 is connected directly to the interior of cylinder 102 and cannot be isolated.

In an embodiment, heat shrink tube 714 may be used only when environmental contaminants or debris are a concern. The presence of tube 714 slows the triggering event by a small amount (<5 seconds). Heat shrink is preferably polyolefin and an ultra thin-walled size is used in order to maximize the completeness of its rupture if PRD 222 is triggered.

A feature provided by PRD 222 is its fast response time to overheating. In a use case where valve 100 is attached to a relatively small tank, the fast response of PRD 222 is a safety feature. This is because the smaller a cylinder is the faster it gets in trouble in a fire and the quicker it may burst. The smaller the tank, the faster the PRD must trigger and vent to keep it safe. For example, taking the triggering speed of a PRD required for a 100 L tank as a baseline, a 320 L tank would require a PRD with a response of approximately 72% of the baseline. A 9 L tank would require 26% of the baseline time. For tank 102, which has a volume of 2.8 L, the response time would need to be just 17% of the baseline.

The embodiment of PRD 222 described with regard to FIG. 7 provides a triggering time of approximately 14% of a standard PRD. In the embodiment, the triggering time is ascribed to: the ultra-fast thermobulb (38% of the trigger time of a "standard" thermobulb); an all-aluminum construction for faster heat transfer; and the greatly reduced size, which provide for a lower total heat gain needed to trigger—aka, a lower thermal inertia.

Commercially available regulators in this class are not known to offer adequate fire protection. That is, while regulators offering burst disc style PRDs are known, no known regulators thermally triggered PRDs. Burst discs do not themselves offer reliable fire protection because they may not vent a cylinder in a fire before rupture occurs. Fusible metal PRD's may be available, but they have traits which make them undesirable. The fusible metals may extrude and leak before their fuse-temperatures are reached. During a triggering event they may repetitively "melt" and refreeze resulting in start-stop or partial-flow behavior. Lastly, alternate triggering temperatures may be hard to create.

In contrast, in embodiments, PRD 222 provides the following features: thermobulb trigger 713; no cold flow; no partial triggering; alternate trigger temperatures; ultra fast response; low mass aluminum for fast triggering; reliability (from proven SAE AS568A seals); a flow limiting option; and tamper resistance.

Triggering element 713, is a CHO-fluid filled glass bulb such as used in fire-suppression sprinkler elements systems. The glass bulb is extraordinarily strong in compression. At the calibrated temperature, the fluid expands to the point that it violently bursts the glass bulb, allowing the piston to move and vent-flow to occur. Below the triggering temperature there are no fatigue issues from repetitive cyclic loads. Thus, there is no cold flow and no premature leaks as may be seen with fusible metal PRD's. Also, when the triggering temperature is reached, the bulb violently shatters. Thus, the venting process cannot be stopped or reversed. So, there is no start/stop flow nor partial flow. Similarly, the interior of PRD 222 housing is designed with an excess of storage volume so that there is space for the glass shards to be store and for the released piston to always move to the full flow position. Thus, PRD 222 achieve the same flow upon triggering. Then, the triggering temperature is set on the production line. The thermobulb is initially open and filled to overflowing. It is then moved into a thermal chamber set for the desired trigger temperature. The "excess" fluid expands over the top of the bulb and escapes. The bulbs are then sealed shut, having retained the right amount of fluid needed to trigger at the desired temperature. Thus, an infinite number of triggering temperatures may be easily selected. As such, thermobulb 713's triggering point may be adjusted to user/application needs.

Thermobulb PRD's may be found commercially. However, known devices are exceptionally large, with extremely high flows that may propel the tank at a high velocity, and thus are inappropriate for use in regulator valve 100. Known devices are typically made from brass (high mass, slow thermal response) and occupy approximately half the volume of regulator valve 100. PRD 222 may have an all-aluminum construction, a 0.112" piston 715 and an assembled mass of 4 grams. PRD 222 may have on the order of 5.7% of a typical commercial PRD's mass and 19% of its flow. So, it is much more efficient at creating flow. This design is 3.3 time as efficient at creating vent flow per gram (19%÷5.7%=3.3×). Based on the masses (4 or 70 grams) and specific heat capacities (0.214 or 0.09 BTU/lb-° F., for aluminum and brass, respectively), PRD 222 would be expected to trigger in 13.6% of the time of the commercial unit. That is, the relative heat needed to warm the commercial unit would be 0.09 BTU/lb-° F. The approximate heat to warm the 70-gram commercial brass PRD would be 0.014 BTU/° F. (0.09×70/453.6). In contrast, the 4-gram aluminum PRD 222 would need only 0.002 BTU/° F. (0.214×4/453.6). Thus, the design factors and use of aluminum make this an ultra-fast PRD. The primary consideration with a PRD is that it vent the cylinder before the cylinder explodes during a fire. Small cylinders, e.g., 1.5 L, have high surface to volume ratios and heat up extraordinarily quickly in a fire. When it is determined that a commercial PRD takes 5× too long to trigger, the PRD chosen should trigger in 20% of the commercial time or less. Accordingly, a commercial PRD with a heat to warm of 0.015 BTU/° F. would need to be replaced with a PRD with a heat to warm equal to or less than 0.003 BTU/° F. Thus, an embodiment of regulator 100 with a thermal PRD provides the feature that the thermal response of the PRD within the valve—as a whole—may be determined and provided to designers. This provides designers with more precise safety-related data than just the response of the PRD in the absence of the PRD's whatever apparatus it may eventually be attached to. For example, should it be possible to gather and assemble ("gang up") the various components of an embodiment of a regulator, the actual response of the PRD in the ganged-up assembly would be uncertain because the response rate may be affected by the nature (e.g., mass and arrangement) of the assembly. In other words, in an embodiment of regulator 100 with a thermal PRD, the rate of the warming of the regulator given an external temperature may be determined.

Such speed enhances safety of regulator valve 100 when combined with smaller tanks. Smaller tanks have larger surface to volume ratios and therefore gain heat faster. Thus, the smaller a cylinder is the faster it gets in trouble in a fire and the quicker it may burst. As a result, a faster PRD is required to keep a smaller tank safe. TABLE 1 illustrates PRD triggering speeds for different tank sizes.

TABLE 1

Why smaller tanks need faster PRDS's

| | | Tank example | | | |
|---|---|---|---|---|---|
| | | A | B | C | D |
| Tank water volume: Liters | | 2.8 | 9.0 | 320 | 795 |
| Tank diameter: inches | | 4.0 | 7.0 | 15.9 | 26.5 |
| Tank length: inches | | 17.0 | 20.9 | 123.1 | 81.0 |
| Approximate Surface:Volume ratio (S:V) | | 1.22 | 0.77 | 0.28 | 0.20 |
| Relative PRD triggering speed required | In % of baseline | 17% | 26% | 72% | 100% |
| | In seconds (example) | 20 | 31 | 86 | 120 |

In TABLE 1, the baseline value was Example D, which used a 795 liter Ø26.5"×81" tank. The surface to volume ration of Tank D is approximately 0.20:1. It would gain heat very slowly in a fire and could survive a fairly long time before its PRD must trigger. Examples A and B used 9 L and 2.8 L tanks, respectively, and represent use cases for certain embodiments of regulator valve 100. Their S:V's are 0.77 and 1.22. They'd gain heat in a fire much faster than the 795 L tank. So, their PRD's should trigger much faster to provide the same level of protection. Preferably, they'd need to trigger in 17% and 26%, respectively, of the time needed for the baseline 795 L tank. Thus, PRD 222, which is projected to trigger in 13.6% of the typical time, may be employed to safeguard tanks of the size of Example A, B, and C, to the level that Example D is protected by commercially available PRDs.

In an embodiment, high-pressure seal-set 721, 722, may be a standard SAE AS568A O-ring and shaped back-up ring. That format has been proven in Hydrogen service at pressures up to 875 bar (12,700 psi). In the embodiment, the ring set is –005 size, the smallest size SAE back-up ring that is readily available.

A benefit of sealing on the ID of the ring is that a –005 size can accommodate a 0.112" piston OD. To maintain the required strength, the piston's head is larger; 0.179" OD. To accommodate that, washers 721, 723 create the leading and trailing edges of the O-ring gland. Trailing washer 723 is kept in-place by an internal retaining ring 724. This approach allows the PRD parts to assembled from the stud end (high pressure end). Thus, once installed in its port, the PRD is tampering resistant. There are no external features which may be loosened.

If a 100% flow efficiency is assumed, a commercial PRD with a 6.5 mm orifice would have 5.2× the flow of PRD 222. For some applications, PRD 222's flow (with a 0.112" orifice) is acceptable. For smaller cylinders, that flow rate might be excessive, venting the cylinder too quickly. In such cases, the trailing washer 723 may have a stepped bore, with the smaller bore being presented to the high-pressure gas. The smaller bore would thus be a restriction, limiting flow. The flow could be reduced without changing the proven seal-set. For example, if the stepped bore in washer 723 were 0.112" and 0.056", the flow could be reduced to 25% of the starting amount. Thus, a single PRD may cover a wide range of flow demands by just revising washer 723.

Figure 8:
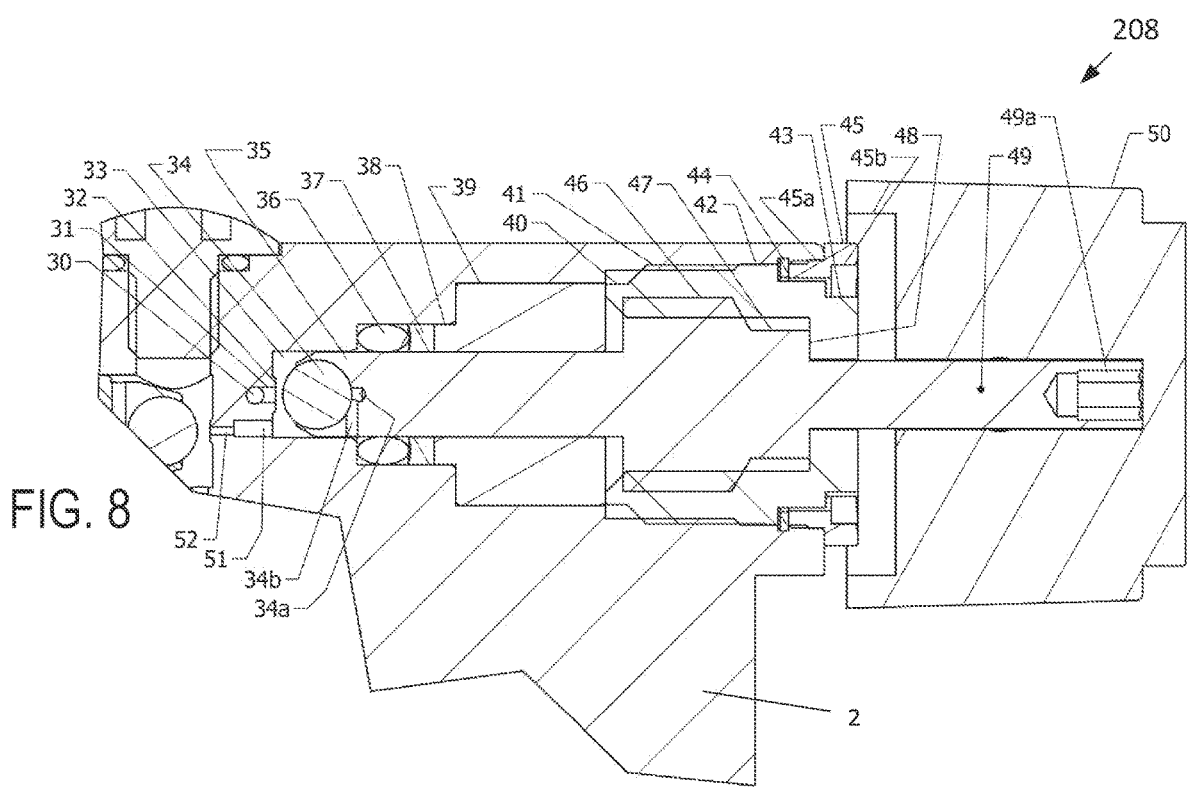
FIG. 8 is a cross-sectional view of the section indicated in FIG. 5E.

FIG. 8 is a cross-sectional view of the section indicated in FIG. 5E. FIG. 8 is a horizontal cross-section thru the plane of regulator stages 210, 212, localized to the area around manual valve 208. In FIG. 8, gas from the tank is brought to a conical inlet seat 32 by passages 30, 31, both of which are sized to deliver the valve's required flow. As noted, passages 30, 31 are in fluid communication with the tank's interior via passages 160, 161, 162 (FIG. 16). If manual valve 208 is open (as shown), gas flow from the tank enters annular cavity 33, the manual valve's outlet chamber. Outlet passage 51 connects cavity 33 to a first stage inlet bore 52. Bore 52 is larger than bore 51 to facilitate the long drilling depth. Flow out of the tank is controlled by ball seal 34, which sits in a suitable cavity in the manual valve stem 35. Intersecting drillings 34a, 34b vent the back side of the ball seal. Ball 34 may be made from a suitable resilient material such as Teflon, acetal, or nylon. Testing has shown that elastomers such as nitriles and polyurethanes may not survive the repetitive explosive decompression events encountered when the manual valve is opened against no or very low outlet pressure.

O-ring 36 and back-up ring 37 seal valve stem 35 to the body to prevent external leaks. The seal set 36, 37 may be made from suitable elastomeric materials such as nitriles or polyurethanes. All nitrile or polyurethane materials used with high pressure hydrogen should be proven compatible with high pressure hydrogen and have received special processing for hydrogen use. As shown, seal set 36, 37 are of the SAE AS 568 size –007.

A close fit, low-friction bearing (including 38, 39) centers stem 35, lowering friction and preventing tilt. The bearing is made from a bearing-grade PEI plastic containing PTFE and graphite to reduce friction and carbon fiber to enhance strength. That plastic has been proven to be compatible with high pressure hydrogen. The bearing has a short, smaller end 38 that is a tight fit to a companion bore in body 2 and prevents seal extrusion. The bearing's larger and longer second diameter 39 has a tight fit to a companion bore in the body and provides the centering function. A threaded nut (40, 41) clamps the bearing in body 2. The nut has seating end 40 that clamps the bearing, a threaded portion 41 that provides the attachment and clamping force. A relief 42 in body 2 provides OD clearance where the nut threads 41 run out (i.e., partial threads). An internal retaining ring (snap ring) 44 mates with a companion groove in body 2 and ensures the nut cannot be accidentally removed. A hex feature 43 on the end of the nut allows it to be torqued. A tamper resistant safety retainer nut 45 further discourages tampering and accidental removal of the nut. Nut 45 is held in the body by left hand threads 45a. Nut 45 has an octagonal socket 45b as a torque drive feature. Torquing the nut requires a custom hollow octagonal tool, which is thus very tamper resistant. The hollow feature is needed for such an octagonal tool to be inserted over the protruding manual valve drive-stem 49.

Valve stem 35 has a fine finish and a tight tolerance on the OD to work with the high-pressure seal set 36, 37. The middle of the manual valve has a threaded portion 46, whose distal end is reduced to a smaller seating diameter 47. Manual valve threads 46 are of an appropriate size and coarse pitch to produce an opened-to-closed travel of approximately a quarter-turn. In this embodiment, the threads on the ID of the nut and OD of the manual valve are metric trapezoidal TR9×2. In that case, 90° of rotation produces an opening stroke of 0.5 mm. As shown, the manual valve's source bore 30 is 0.79 and the inlet bore 31 is 0.71 mm, providing a stroke to bore ratio of 0.704:1. Thus, the opened manual valve would not restrict flow. In fact, that stroke may support bores 30, 31 as large as approximately 1.25 mm.

A seating shoulder 47 provides a positive stop in the opening direction by contacting a companion face 48 in nut (40, 41). The manual valve has a reduced diameter drive-stem section 49 that is suitably sized for attaching a handle, knob or lever to actuate the valve. In the embodiment, a knob 50 is used that has an elongated lever shape for the most comfortable application of torque by hand. Drive stem 49 includes an Allen socket 49a in its distal end to support assembly of the valve before knob 50 is attached. If the knob is omitted, that socket allows operating the valve with an Allen bit.

Figure 9:
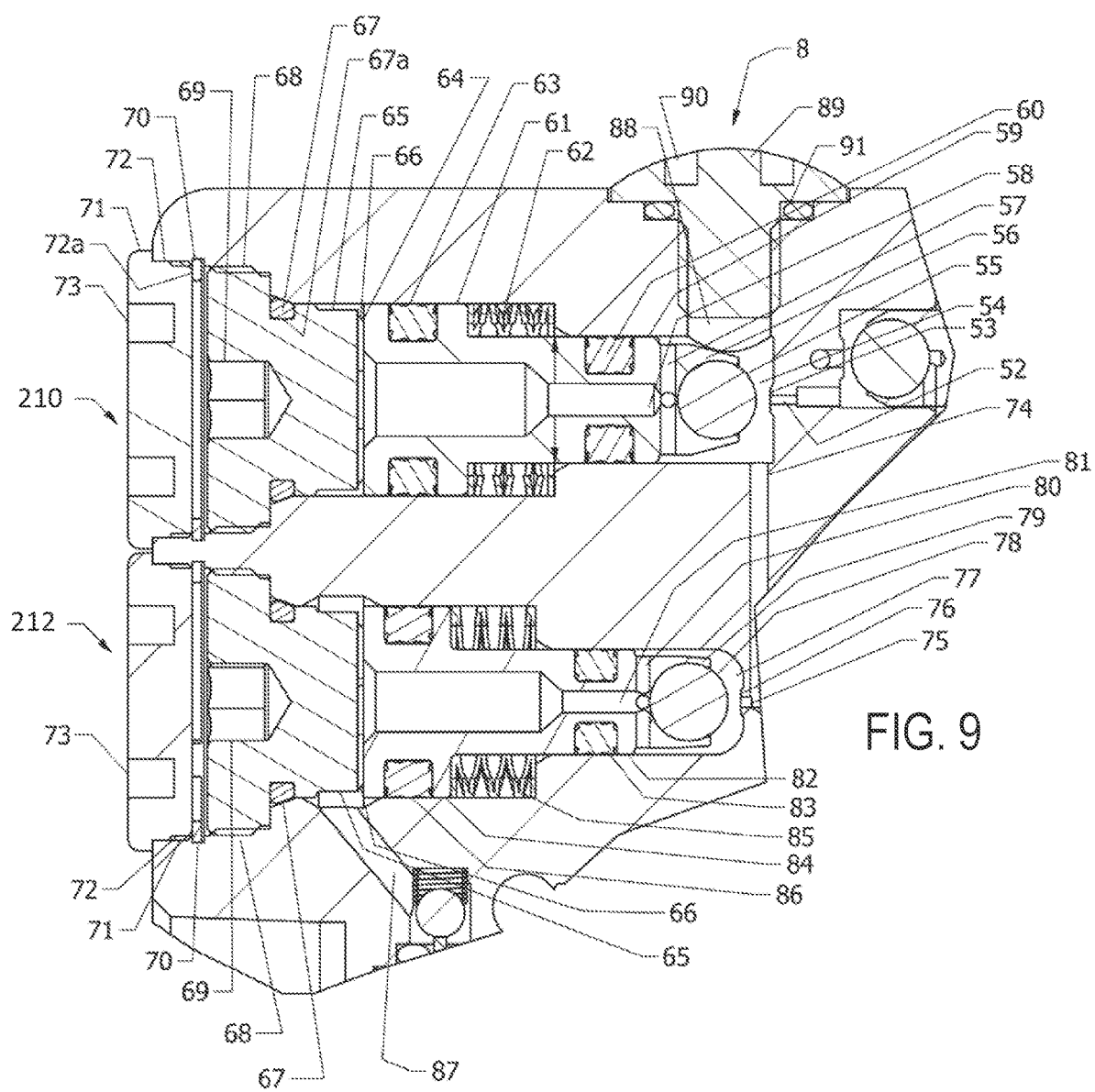
FIG. 9 is a cross-sectional view of the section indicated in FIG. 5E.

FIG. 9 is a cross-sectional view of the section depicted in FIG. 5E. FIG. 9 is a horizontal cross-section through the plane of regulator stages 210, 212.

Regarding first regulator stage 210, gas from manual valve 208 passes on to stage 210 through bore 52, which terminates in a raised, narrow, conical seat 53. The seat is sealed by a spherical seal 55, which is made of a suitable resilient material such as Teflon, acetal, or nylon. Depending on inlet pressures, ball 55 may also be an elastomer such as nitrile or polyurethane. Gas admitted by ball 55 enters chamber 54 and creates the first stage regulated pressure.

Ball seal 55 is held in a suitable cavity in the proximal end of a regulating piston including three diameters: a smallest diameter 56 on the ball-seal end; a larger diameter 59 which accommodates a seal 60; and largest diameter 61 which accommodates larger seal 63. Cross drilled holes 57 communicate the regulated first stage pressure to the piston's interior bore 58. Bore 58 may be stepped, as shown, to reduce weight or it may be a small single diameter for simplicity's sake.

The piston is sealed to a two-step bore in body 2 by two dynamic seals 60, 63. As shown the two seal sizes are SAE AS568 sizes –004 and –008. To reduce friction and enhance life versus O-rings, those seals may be multi-lobed rubber seals such as X-rings, Quad Rings or Multi-Seals. They may be made from appropriate elastomers such as nitrile or polyurethane. The multiple lobes reduce friction by reducing contact area. They also have crevice volumes which can store lubrication to further reduce friction.

It's notable that a –004 seal is the second smallest SAE AS 568 seal that may be predictably stretched into a piston-style gland without breaking. The piston OD is 0.2055" and the seal ID is 0.070". That nominally stretches the seal's ID to 2.94× its original size. Many elastomers break with that amount of stretch. Thus, the –004 size impacts elastomer choice.

The piston's largest diameter 61 acts against a spring 62. As shown, spring 62 is a crest-to-crest wave-spring. The crest-to-crest spring is chosen as it delivers the desired spring force in approximately half the axial length of a helical coil spring. It also avoids the assembly difficulties and unpredictable behavior of a stack of Belleville washers. The crest-to-crest spring allows a smaller valve body and small piston length, reducing mass.

Spring 62 acts against diameter 63 to open the piston, increasing flow and first stage pressure. Force from stage one's pressure acts to close the piston, reducing flow and pressure. As one of skill will know, by choosing stroke, diameters, spring length and spring rate the desired first stage pressure may be set. The annular area containing spring 62 is connected to atmospheric pressure by drilling 163a (shown in FIG. 2). The first stage pressure acts against the two seals (60, 63) in opposing directions. The net force is proportional to pressure×the difference in their two areas and acts to close the piston as pressure increases. Thus, the piston diameter choices (59, 61) set the force needed from the spring at any given set-pressure. Thus, they are an important part of the calibration.

In FIG. 9, the first stage piston (diameters 56, 59, 61) is shown in its maximum flow position. Its maximum flow travel is limited by a piston retainer which has a smaller-diameter positive stop end 65, O-ring gland 67a, and a large threaded end 68. Face reliefs 66 ensure that even if the piston is seated hard against the retainer gas pressure reaches and acts against the entire area of seal 63. The face reliefs are easily visualized in FIG. 18. An O-ring 67 seals the piston retainer to body 2.

An internal retaining ring 70 ensures the piston retainer cannot be accidentally removed. A tamper resistant cover prevents accidental removal of the snap ring. The cover comprises a threaded section 72 ending in a flat face 72a; a large seating diameter 71, and 2 pin-wrench holes 73 that provide a torquing feature. The thread 72 is a left-hand thread to discourage tampering. As the norm is to assume righthand threads, a typical attempt at tampering would include applying a CCW torque to the cover. However, as the cover-threads are left-hand, that would just tighten the cover more. The seating face 72a is close to the internal retaining ring and prevents it from being expelled or removed. Hole 164b (shown in FIG. 2) vents the space between retaining ring 70 and the safety cover so that leakage or permeation pressure cannot build up and pressurize the cover.

Regarding second regulator stage 212, a drilling 74 connects the first stage pressure (chamber 54) to second stage 212's inlet via bore 75. Bore 75 terminates in second stage 212's regulated pressure chamber 77 as a narrow, raised, conical seat 76. The seat is sealed by a spherical seal 78, which is made of an elastomer such as nitrile or polyurethane. Gas admitted by ball 78 enters chamber 77 and creates second stage regulated pressure. Ball seal 78 is held in a suitable cavity in the proximal end of a regulating piston comprising three diameters: a smallest diameter 79 on the ball-seal end; a larger diameter 82 which accommodates a seal 83; and largest diameter 84 which accommodates larger seal 86. Cross drilled holes 80 communicate the regulated second stage pressure to the piston's interior bore 81. Bore 81 may be stepped, as shown, to reduce weight or it may be a small single diameter for simplicity's sake.

The second stage piston is sealed to its two-step bore by two dynamic seals 83, 86. As shown the two seal sizes are SAE AS568 sizes –003 and –008. To reduce friction and enhance life versus O-rings, those seals are multi-lobed rubber seals such as X-rings, Quad Rings or Multi-Seals. They are made from appropriate elastomers such as nitrile or polyurethane. The multiple lobes reduce friction by reducing contact area. They also have crevice volumes which can store lubrication to further reduce friction. It's notable that a –003 seal is the smallest SAE AS 568 seal that may be predictably stretched into a piston-style gland without breaking. The piston OD is 0.1715" and the seal ID is 0.056". That nominally stretches the seal's ID to 3.06× its original size. Many elastomers break with that amount of stretch. Thus, the –003 size impacts elastomer choice.

The piston's largest diameter 84 acts against a spring 85. As shown, the spring is a crest-to-crest wave-spring. The crest-to-crest spring is preferred as it delivers the desired spring force in approximately half the axial length of a helical coil spring. It allows a smaller valve body and small piston length, reducing mass. Spring 85 acts to open the piston, increasing flow and second stage pressure. Force from the second stage pressure acts to close the piston, reducing flow and pressure. As one of skill would know, by choosing stroke, diameters, spring length and spring rate the desired pressure may be set. The annular area containing spring 85 is connected to atmospheric pressure by drilling 163b (shown in FIG. 2). The second stage pressure acts against the two seals (83, 86) in opposing directions. The net force is proportional to pressure×the difference in their two areas and acts to close the piston as pressure increases. The diameter choices (82, 84) control the force needed from the spring. Thus, they are an important part of the calibration.

In FIG. 9, the second stage piston (diameters 79, 82, 84) is shown in its maximum flow position. Its maximum flow travel is limited by a piston retainer which has a smaller positive stop end 65, O-ring gland 67a, and a large threaded end 68. Face reliefs 66 ensure that even if the piston is seated hard against the retainer that gas pressure reaches and acts against the entire area of seal 63. The face reliefs are easily visualized in FIG. 18. An O-ring 67 seals the piston retainer to body 2. An internal retaining ring 70 ensures the piston retainer cannot be accidentally removed. A tamper resistant cover prevents accidental removal of the snap ring. The cover comprises a threaded section 72 ending in a flat face 72a; a large seating diameter 71, and two pin-wrench holes 73 that provide a torquing feature. The thread 72 is a left-hand thread. The seating face 72a is close to the internal retaining ring and prevents it from being expelled or removed. Hole 164c (shown in FIG. 2) vents the space between retaining ring 70 and the safety cover so that leakage or permeation pressure cannot build up and pressurize the cover. The second stage pressure is communication with the third stage regulator inlet via angled drilling 87 at the distal end of the second stage piston. In the embodiment, that location is chosen as it may be drilled from the second stage port, leaving no construction hole that needs to be plugged.

In embodiments, low-pressure relief valve 224 is an optional feature. In some use cases it may be preferable to have a pressure relief valve PRV 224 on the low-pressure side of first regulator stage 210. If so, port 8 would be populated with PRV 224, which would protect the pressure in bore 88, which is connected to chamber 54, the first stage regulated pressure, which is a relatively low pressure when regulator 210 is functioning properly. In embodiments, such a valve could be a burst disc or a reseating poppet valve (i.e., a resilient ball and a spring of the type depicted in FIG. 14). As shown in FIG. 9, port 8 is not used and is plugged by screw 89 which is sealed to body 2 by O-ring 91. To minimize tampering potential, the screw is shown as having 2 pin-wrench holes 90 to discourage its removal. As shown, the port is located between Stages 1 and 2 is closed by an O-ring and a red-colored spanner screw. In an embodiment, to protect the pressure regulator at a different stage in the flow path, an appropriate PRV may installed with connection to, e.g., drilling 87 (second stage regulated pressure, FIG. 10) or outlet chamber 101 (third stage regulated pressure, FIG. 10).

Figure 10:
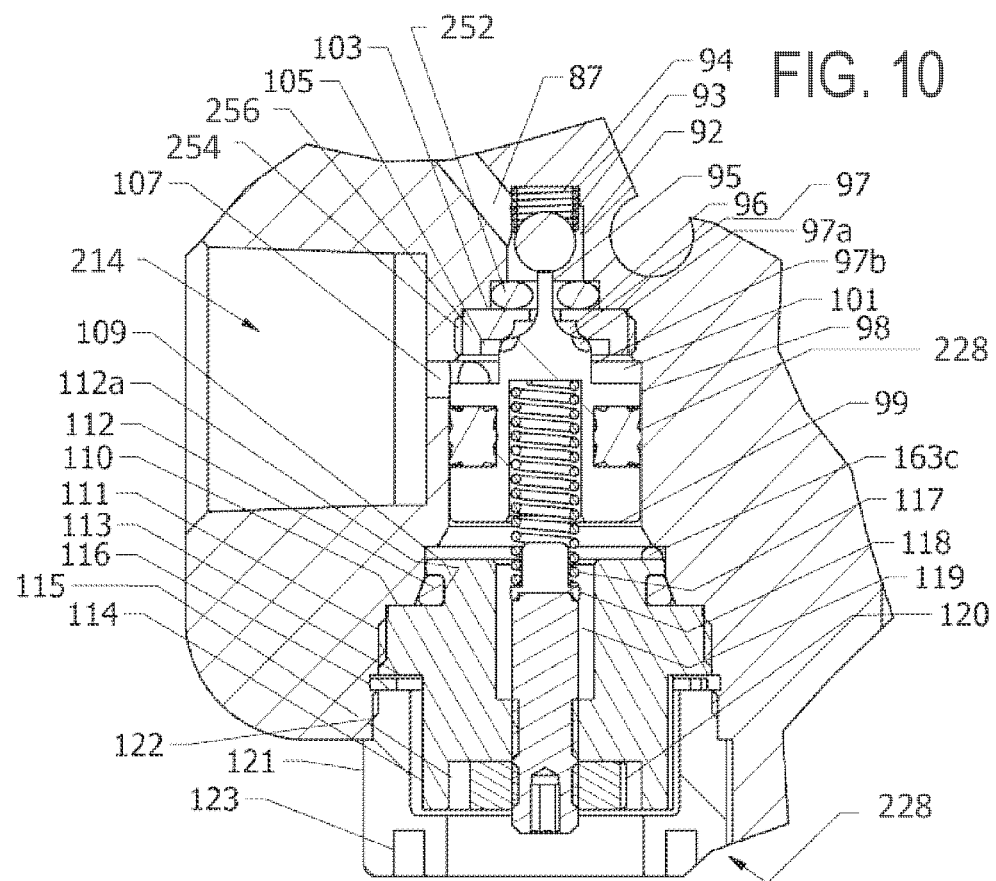
FIG. 10 is a cross-sectional view of the section indicated in FIG. 5E.

FIG. 10 is a cross-sectional view of the section depicted in FIG. 5E. FIG. 10 is a horizontal cross-section thru the plane of regulator stages 210, 210, localized to show third stage regulator 228. In FIG. 10, an angled drilling 87 communicates second stage pressure to the inlet of third regulator stage 228. The third stage inlet includes: an inlet cavity 92, a sealing ball 93, a ball-return spring 94, and an O-ring 252 against which the ball seats and seals. O-ring 252 is clamped in body 2 by seal retainer 256 which has a flat face 103 for clamping the O-ring, a threaded section 254, and a shallow Allen socket 105 for torquing the part.

As shown, O-ring 252 may be an SAE AS 568-002 size and made from a nitrile or polyurethane compound proven to be hydrogen compatible. Sealing ball 93 may be a high grade commercial stainless-steel ball bearing. In the embodiment, it is 2 mm in diameter. Ball-return spring 94 is made from stainless steel. Seal retainer 256 is made from aluminum.

If the ball is open (as shown), gas enters third stage outlet chamber 101 and is reduced to a lower, final outlet pressure. The third stage piston 115 is made from aluminum and comprises a stem-tip 95 which controls the ball's position, a contoured zone 97 and sealing diameter 98 which accommodates a multi-lobed seal 100, and seating face 99. The contoured zone 97 blends the stem-tip 95 to the larger intermediate diameter 97b. Zone 97 has four scallops 97a machined in 90° intervals into the piston face so that it cannot create a gas tight seal against retainer 256 at the maximum stroke. At the maximum stroke (as shown) gas flows thru annular zone 96, into the four scalloped reliefs 97a, then into outlet chamber 101. Multi-lobed seal 100 may be an SAE AS 568-006 size and made from a nitrile or polyurethane compound proven to be hydrogen compatible. One of skill will realize that the shape and number of scallops 97a may be adjusted arbitrarily as necessary to provide an indentation large enough to provide sufficient flow between retainer 256 and seal face 96.

Gas in the outlet chamber acts against the area of seal 100. Increasing pressure acts to move piston 115 towards the no-flow position. Coil spring 117 acts in opposition to push piston 115 towards the full flow position. Spring 117 slides in a companion bore in piston 115 and is biased towards the desired preload by an adjustment screw 119, which pushes against spring adjuster disc 118, which engages spring 117. Adjustment screw 119 may be a set screw with an Allen socket end. A jam nut 120 allows locking the adjustment screw once the desired outlet pressure is set.

The no flow position of piston 115 is limited by a piston retainer 114 including a stop face 109, an O-ring gland 112a, seating face 110, threads 111, and an end face 113. End face 113 engages an internal retaining ring 116, which prevents accidentally removing the piston retainer. An O-ring 110 seals the piston retainer to body 2. Hole 163c delivers atmospheric pressure to the reference side of the $3^{rd}$ stage piston.

At and near the maximum no-flow position, the piston tip 95 has disengaged from ball 93 and return spring 94 forces ball 93 against ring 252 to stop flow.

A tamper resistant cover 121 allows access to the adjustment feature while preventing accidentally removing the internal retaining ring and the piston retainer. The cover has left-hand threads 122 for attachment to body 2 and two pin-wrench drive holes 123 for applying torque.

Figure 11:
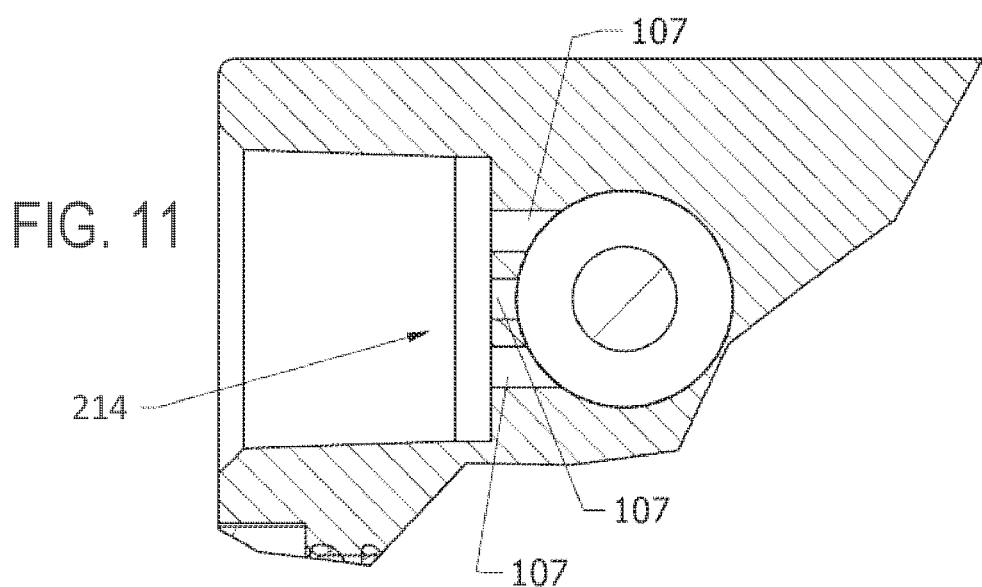
FIG. 11 is a cross-sectional view of the section indicated in FIG. 5E.

Gas in the outlet chamber 101 is connected to the outlet port 13 via three passages 107 (see FIG. 11, which is a cross-sectional view of the section indicated in FIG. 5E, which is though the plane of vent holes 107). As shown, the three holes 107 are each 1.20 mm in diameter (i.e., a total flow area equivalent to a single 2.078 mm bore). If even higher flow were desired, holes 107 could easily be replaced by a single oval slot 1.2 mm high and 3.97 mm center-to center. Such a slot would have a flow area equivalent to a single bore 2.739 mm in diameter (i.e., 73.7% more flow area than three 1.20 mm holes).

FIG. 12 is a cross-sectional view of the section depicted in FIG. 5C. FIG. 12 is a horizontal cross-section through the center of cover 137 of pressure sensor 220. Transducer 22 of pressure sensor 220 resides in a cylindrical cavity in body 2. Cavity 21 has an enlarged undercut (annular space adjacent to port 216) that ensures a high flow rate around the transducer. O-ring 128 and back-up ring 129 seal transducer 22 to body 2. The seal set is an SAE AS568-016 size with the parts made from proven hydrogen compatible nitrile or polyurethane materials. A retainer 130 clamps transducer 22 in body 2 by threads 131. A shoulder 127 contacts the upper face of transducer 22 to affect the clamping operation. A hex socket 1202 allows retainer 130 to be torqued. An internal retaining ring 132 engages companion groove in body 2 and prevents accidental removal of retainer 130. A tamper resistant safety cover 133 prevents accidental removal of the retaining ring 132 and retainer 130. The safety cover has left hand threads 134, to thwart tampering.

The transducer's environmental cover 137 has space for the circuit board 136 that manages the output signal for transducer 22. Environmental cover 137 is sealed to body 2 by an O-ring 139 clamped by a lip 138 in cover 137. The engagement of cover 137 into body 2 is limited by a step in the body against which lip 138 rests.

High pressure transducers come in a wide range of sizes. The pressure transducer 22 and signal conditioning board 136 shown are relatively large. If 22 and/or 136 were smaller, the accommodating features would be reduced in size accordingly.

Figure 13:
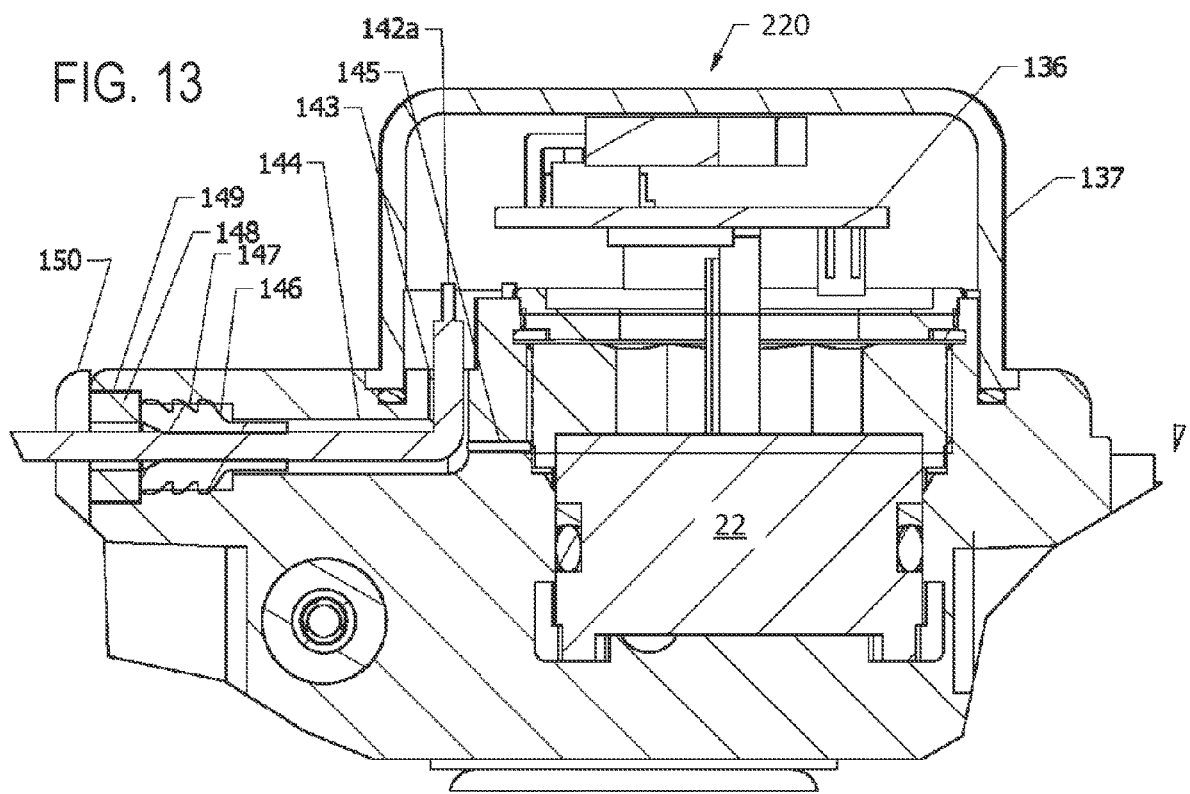
FIG. 13 is a cross-sectional view of the section indicated in FIG. 5B.

FIG. 13 is a cross-sectional view of the section indicated in FIG. 5E. FIG. 13 is a vertical cross-section thru center of pressure transducer wire 142a, showing the routing and sealing of the output wires from pressure transducer 14. In FIG. 13, wire 142a passes thru a plastic insulator/washer 148 which mates with bore 149 in body 2. The insulator may be made from a wide range of plastics including nylon, acetal, and Ultem. Insulator 148 serves to retain wire-seal 147 and to provide a smooth edge so that sideways forces into wire 142 don't cut the wire's insulation. Wire seal 147 resides in bore 146 in body 2 and is a commercial, high-volume automotive part such as AMP SSC 184140-1, made of silicone. Wire 142 passes thru a horizontal bore 144 and intersects a vertical bore 143 which brings the wire into the transducer cavity bounded by environmental cover 137. The wire is appropriately terminated to circuit board 136 (such termination is not shown in FIG. 13). An intersecting horizontal bore 145 directly connects any leakage or permeation gas from the transducer's O-ring seal-set (128, 129) to wiring passage 143. The wiring circuit passages route wires and can carry leak/permeation gas. That circuit is protected from over-pressure by a low-pressure PRV shown in FIG. 14. All sensor wire routings 142, 142a, 142b follow the format just described, whether 2-wire or 3-wire. If a 2-wire sensor is used, the third wiring channel is plugged at wire-seal 147 to keep contaminants out of the body.

Figure 14:
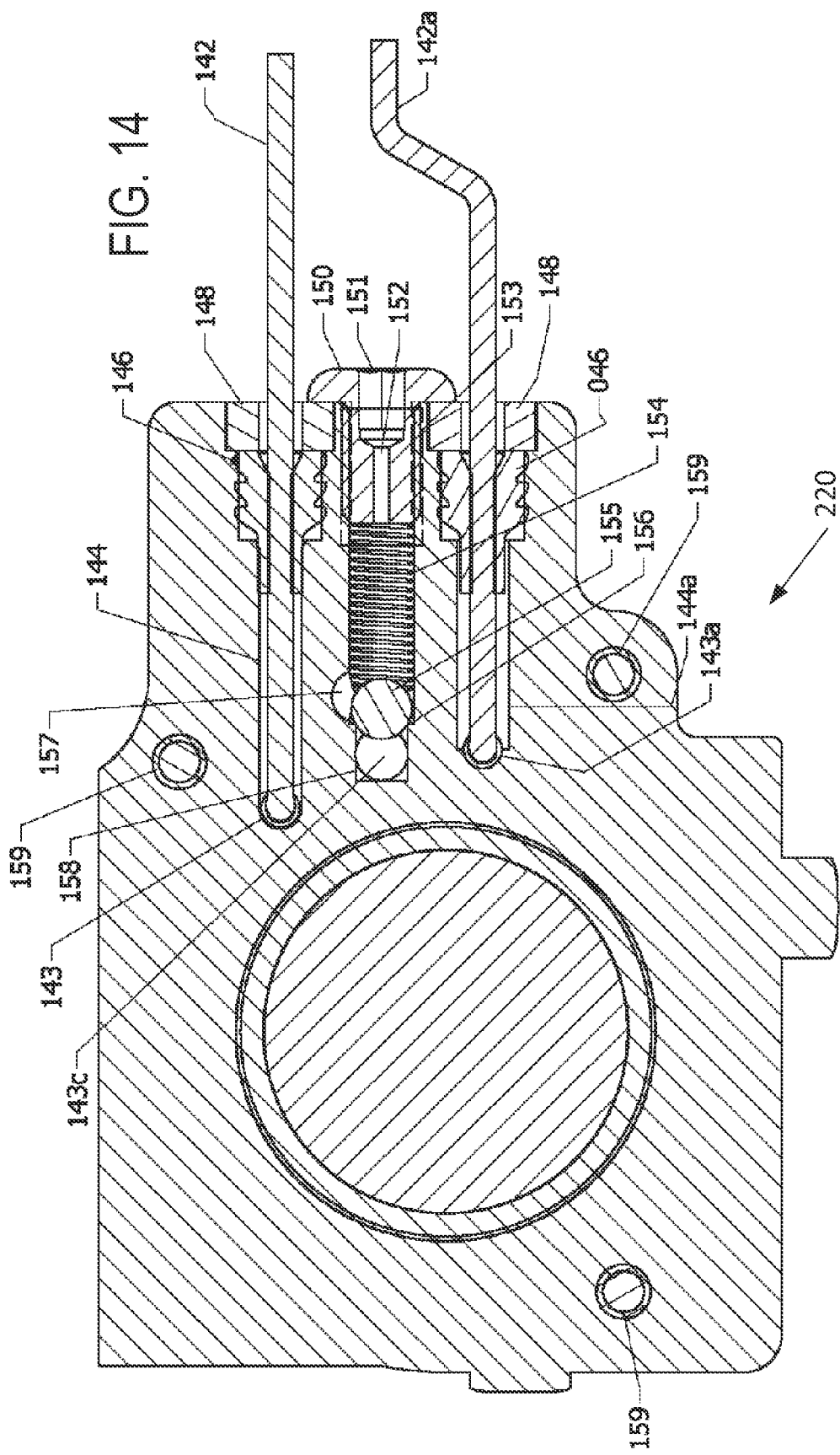
FIG. 14 is a cross-sectional view of the section indicated in FIG. 5B.

FIG. 14 is a cross-sectional view of the section indicated in FIG. 5B. FIG. 14 is a cross-section thru center of wires 142, 142a of pressure sensor 220 showing the routing and low-pressure relief-valve protection of a simplified body that only accepts a 2-wire pressure transducer 14 (i.e., with only two wire passages). In FIG. 14, both wires are substantially similar—there are two wires (142, 142a), two insulators (148) and two wire seals (146). As described above wire 142 passes thru connecting bores 144 and 143 to enter the cavity closed by environmental cover 137. Wire 142 passes thru bore 144a and 143a to enters the same cavity. If the sensor had three wires, there would be a third substantially similar wire pathway.

Midway between the two wiring circuits there is a passage for a low pressure PRV. That PRV comprises a resilient ball 155 that provides the relief valve on-off control, a spring 154 that controls the PRV cracking pressure, a sharp-edged seat 156 against which ball 155 seats, a screw 150 against which the distal end of the spring seats, an inlet bore 143c that is in fluid communication with the interior of the environmental cover 137, a stepped bore 158, and a primary vent bore 157 that vents gas to the rear face of body 2. As shown, screw 150 is an optional vented style (hollow); gas can also vent thru its central bore. Screw 150 also serves to retainer both insulators 148 and their associated wire seals 146. Ball seal 155 is of an appropriate resilient material such as nitrile or polyurethane or a harder material such as Nylon, Teflon or Acetal. Screw 150 has an Allen socket drive 151, vent bore 152, and appropriate threads 153.

Figure 15:
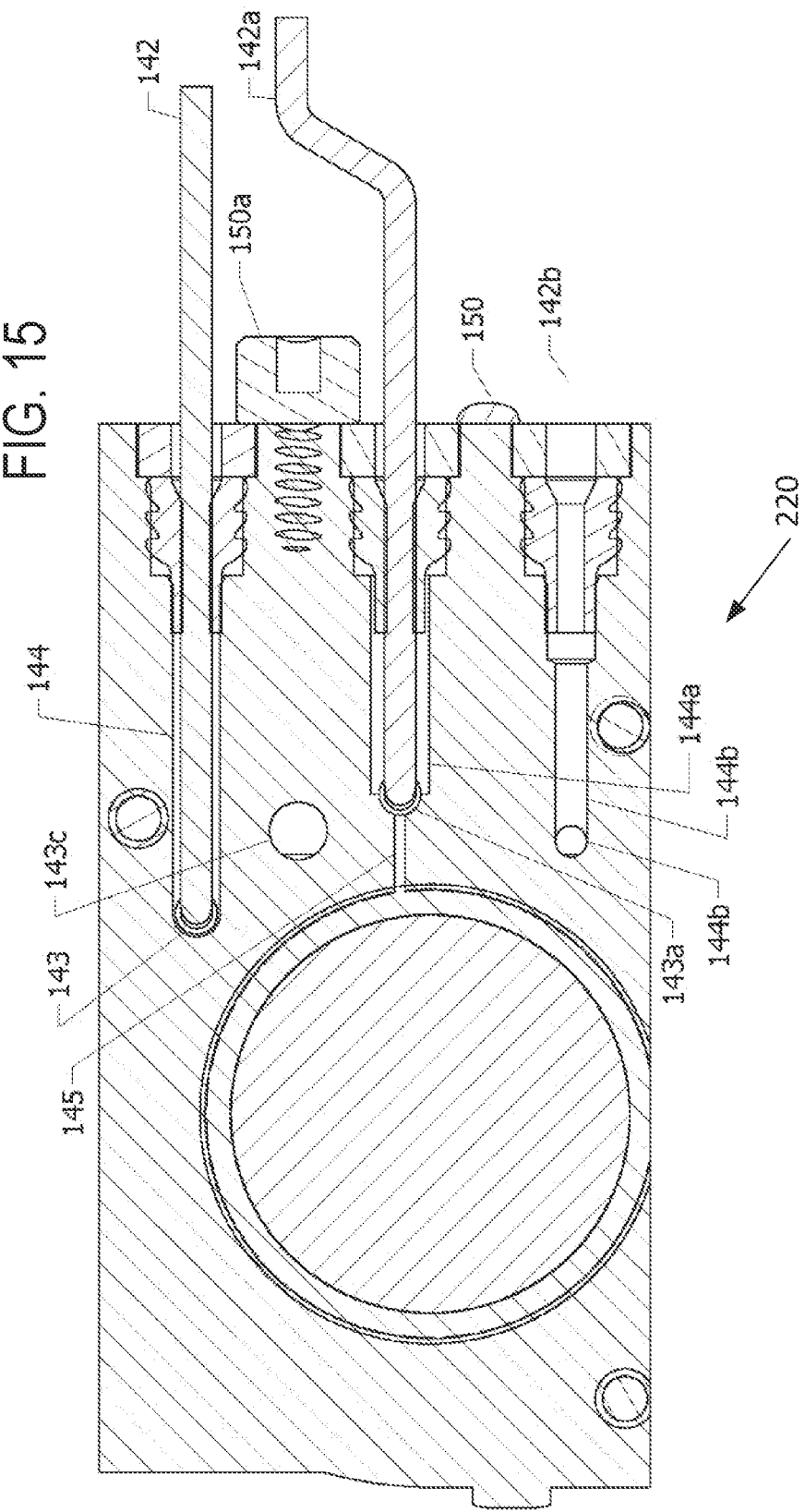
FIG. 15 is a cross-sectional view of the section indicated in FIG. 5A.

FIG. 15 is a cross-sectional view of the section indicated in FIG. 5A. FIG. 15 is a cross-section thru center of pressure transducer wires 142, 142a, 142b of pressure sensor 220 showing the routing and low-pressure relief-valve protection for the body as shown in FIG. 3 and FIG. 4 with wire passages for 3-wires (e.g., for a 3-wire pressure transducer 14). In the case of a body with three wire passages, the PRV is moved slightly off plane to fit within the same package, and the PRV ball/spring are in the bore closed by screw 150a (instead of screw 150).

Figure 17:
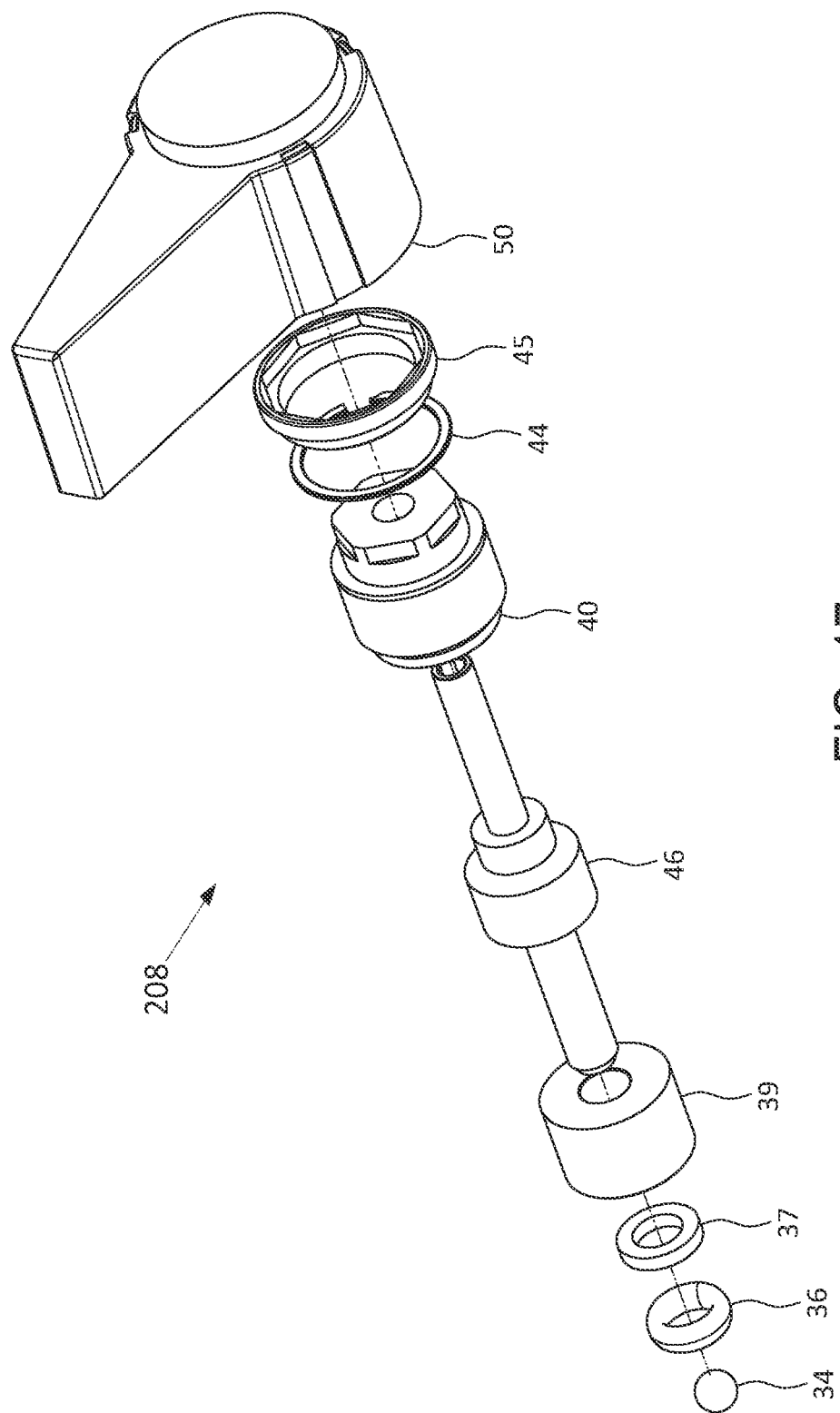
FIG. 17 is an assembly drawing of an embodiment of a valve.

FIG. 17 is an assembly view further illustrating manual valve 208. It is desirable to be able to isolate regulator stages 210, 212, 228 from tank pressure; that is, to have manual valve 208 between tank 202 and the regulator stages. When closed, valve 208 isolates the regulator stages from potentially harmful pressure pulsations during fast filling and allows servicing the downstream system without emptying the tank. Quarter-turn manual valve 208 has the following features: it is fast to operate, the lever clearly indicates the valve state, and it has a high cycle lifespan. In the embodiment of manual valve 208, very coarse threads 46 provide the linear motion necessary to seal ball 34 against seat 32. This is unlike a typical quarter-turn valve in which the seal is accomplished by creating a discontinuity in the flow-path and extra torque has no effect on whether the valve seals properly. That is, valve 208, as a result of being threaded 46, may be hand-tightened to ensure the seal of ball 34 against seat 32 to compensate for the effects of wear on valve 208. Such is not possible with a typical quarter-turn valve. In other words, additional turning may be applied to improve the seal of ball 34 against seat 32, e.g., three-eighths or even a half-turn. However, since a smaller thread is desirable as the torque to create a given sealing force decreases as thread diameter decreases, a balance needs to be struck between too fine a thread, which would result in requiring too much turning for a given sealing distance, and too coarse a thread, which would require too large a sealing torque. Being a quarter-turn valve, the position of lever 50 indicates whether it is open or closed. In contrast, with a typical multi-turn valve the position of the control knob or lever does not usually indicate whether the valve is open or closed. As such, manual valve 208 incorporates advantages of both typical quarter-turn valves and multi-turn valves. Valve 208 is very compact, close to the size of a typical multi-turn valve. A lever-style knob 50 is used for maximum comfort when opening/closing the valve. The swing-space needed for the knob/lever 50 is greater than for a multiturn valve's knob but less than for a typical quarter-turn valve.

In general, manual valves have two seals: for flow control, and the stem. Because the sealing force of ball 34 may be increased by additional torque, the cycle life of valve 208 is limited by the stem-seal's life, not the flow control seal. While that is the norm for multi-turn valves, the service life of valve 208 is greatly extended by the stem only turning quarter-turn versus the norm of 1¾ to 2½ turns. That is, there is much less exposure to seal wear due to abrasion, twisting or spiraling. A normal multi-turn valve would expose the seal to seven to ten times as much scrubbing action. Thus, life expectancy is similarly extended. In an embodiment of valve 208, the on-off seal is a commercial, plastic, ball-bearing seating against a sharp-edged orifice. The use of a ball bearing allows the ball to have exceptionally tight diameter and sphericity tolerances at very low cost. The use of a sharp-edged orifice maximizes seating pressure. Thus, the required sealing torque is greatly minimized (i.e., because there is essentially line to line contact). In an embodiment, the ball-orifice mechanism includes a metal ball. However, the use of a metal ball increases the demands on surface finish, cylindricity and alignment and requires higher than desired sealing torques. In comparison, the use of a much more compliant plastic ball reduces both the sealing torque and those machining demands. The lowest torque would result if an elastomer ball seal were used. However, hydrogen compatible elastomers typically have insufficient tolerance of repetitive gas explosive decompression (GED) events. Such events are unavoidable with this type of design. Accordingly, elastomers are unadvisable, particularly until issues with GED events are resolved. On the other hand, several engineering plastics have been proven to be tolerant of hydrogen and have excellent GED tolerance. Those include: virgin PTFE (Teflon); acetal copolymer (Delrin); Nylon; and PEEK. In that order, the plastics are increasingly harder and thus have increasingly longer life expectancies and increasingly higher torques to seal. That is especially true at low temperatures (i.e., −40° C.). While all have acceptable performance, PTFE is preferred from a torque to seal standpoint.

In an embodiment, as shown in FIG. 8 and FIG. 17, the manual valve circuit has a 0.79 mm source bore 30 leading to a 0.71 mm in inlet orifice 31 with a 0.368 mm outlet bore. The manual valve stroke is 0.356 mm or 50% of the orifice size. Thus, the manual valve flow will be very near to the ideal flow rate for a 0.71 mm orifice. That flow is greater than 3.7 times the capacity of the 0.368 mm outlet bore. Thus, there will be a low pressure drop across the opened manual valve. A stroke of 0.368 mm in 90° equals a pitch of 1.47 mm. The smallest ISO thread profile of 2 mm was chosen because sealing force decreases as thread diameter decreases.

In an embodiment, it is desirable to use a ball bearing greater than or equal to 3 mm (⅛") for ease of handling. It is also very desirable to use a standard SAE AS568A O-ring and shaped back-up ring. Those have been proven in hydrogen at pressures up to 12,600 psi (875 bar). The smallest AS568A size compatible with a ⅛" ball is −007. With the stem-seal occurring on the ring ID (i.e., at 0.156" diameter) the gas axial force is minimized. Allowing space for bearing and retainer threads results in the smallest practical manual valve thread being TR 9×2. At 350 bar (5075 psi), the axial load with a −007 O-ring is 97 lbs. The nominal torque to achieve that with a TR9 thread would be 6.87 lb-in. That is an acceptable torque for hand/finger comfort. By comparison, an M12×1.75 thread would have a predicted torque of 13.74 lb-in, which is an uncomfortable torque to apply by hand. The torque with an M8×1.5 would be predicted at 6.10 lb-in. That is too small a savings for the design difficulties it would have. Hence, the TR9×2 is deemed the optimal size for low cost and efficient production. Note, in the embodiment of 100 there are four ball seals: 3 are ⅛"; one is 2 mm. The 2 mm ball in regulator stage 228 presents a significant assembly challenge.

In order to minimize friction, maintain alignment and prevent binding, in the embodiment, bearing 38, 39 uses a tight tolerance, low-friction, plastic bearing. It is made from a bearing grade PEEK compound containing Teflon, carbon fiber and graphite. The bearing has a guidance L/D of 2:1.

An important aspect of valve 208 is that the closed manual valve is not directly subjected to filling pressure spikes nor the potential for damage from contaminates flowing at/near sonic velocities. For example, in the closed position, if there were a 350 bar change in pressure across the manual valve, the force on the ball would be only 3.12 pounds. As the ball might be closed/clamped at forces up to 97 lbs, an extra 3.12 lbs of load is inconsequential. Furthermore, any contaminants in the fill gas would be aimed into the interior of the cylinder and not into manual valve bore.

Figure 18:
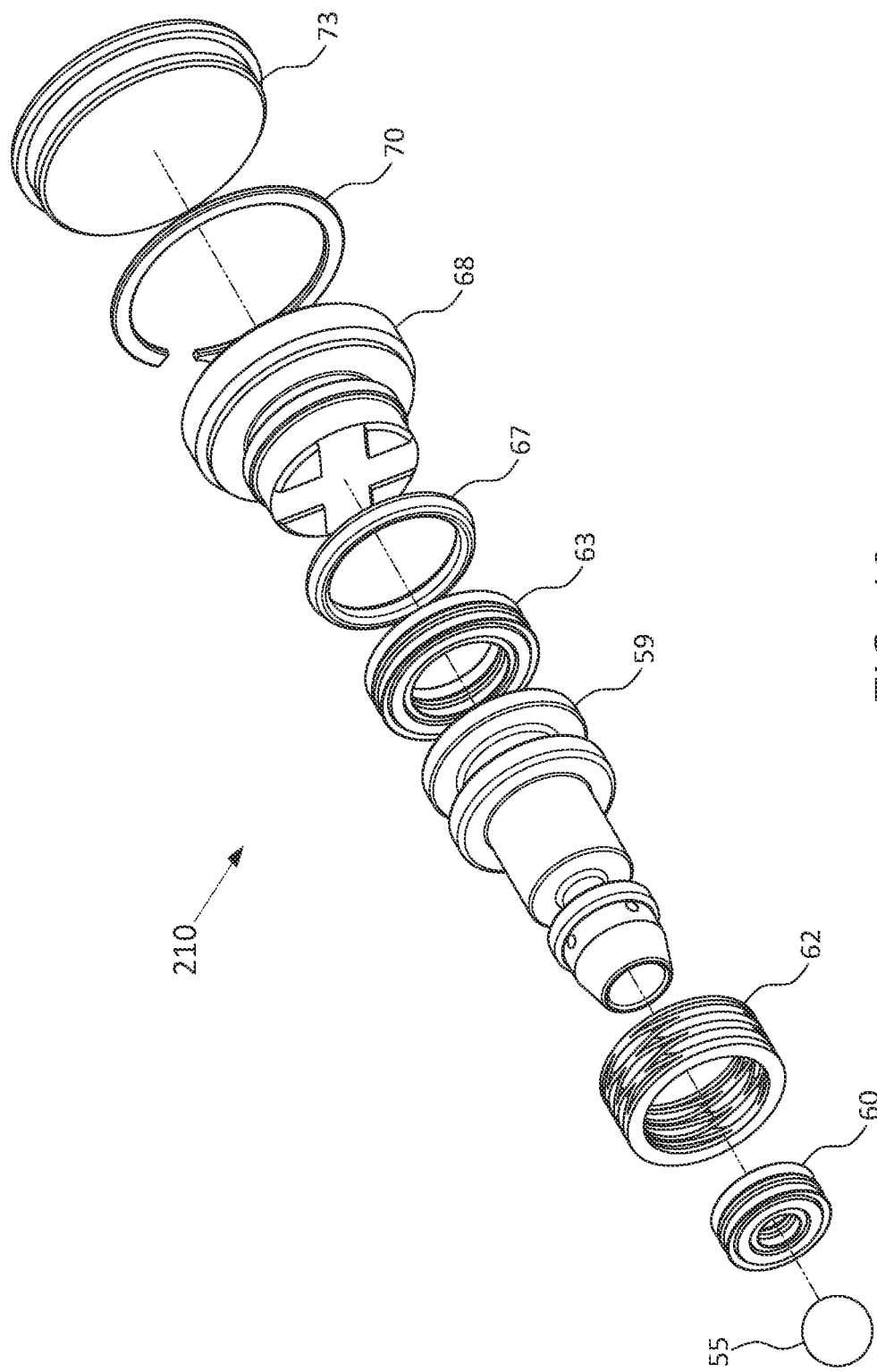
FIG. 18 is an assembly drawing of an embodiment of a regulator stage.

In summary, the features in the manual valve are: a plastic ball bearing seal (providing low cost, high quality, and long life); a valve stem sealing on ID of O-ring (providing a stronger stem; and a stiffer ring for longer life); an ultra coarse pitch (providing for opening seven to ten times faster than typical and a much longer stem-seal life); small diameter threads (minimizing sealing torque); a quarter-turn travel (indicating by the knob/lever position whether valve is opened or closed); a low friction plastic bearing (providing alignment and sealing reliability);

FIG. 18 is an assembly view further illustrating first stage regulator 210 and second stage regulator 212. These regulators use crest to crest wave springs 62 to bias the piston 59 and set the regulated pressures. Such springs need approximately half the axial space of helical coil springs. That reduces body size, reducing mass and cost. The reduced axial length reduces piston length, reducing piston mass. Lower piston mass piston results in faster response times, lower dynamic pressure errors and lower hysteresis. Specifically, there are fewer and smaller pressure spike/dips during abrupt flow changes. After flow reversals there is less pressure overshoot/undershoot (i.e., hysteresis). Additionally, crest to crest springs eliminate a dimensional issue with coil springs. Coil spring manufacturers do not provide OD and ID tolerances. The user must guess what the tolerances might be. The norm is to allow overly large tolerances, making the design larger than necessary. In contrast, crest to crest spring washers define the bore and shaft sizes they work freely with (i.e., no binding or rubbing). Thus, the crest-to-crest wave spring allows optimal designs.

Figure 19:
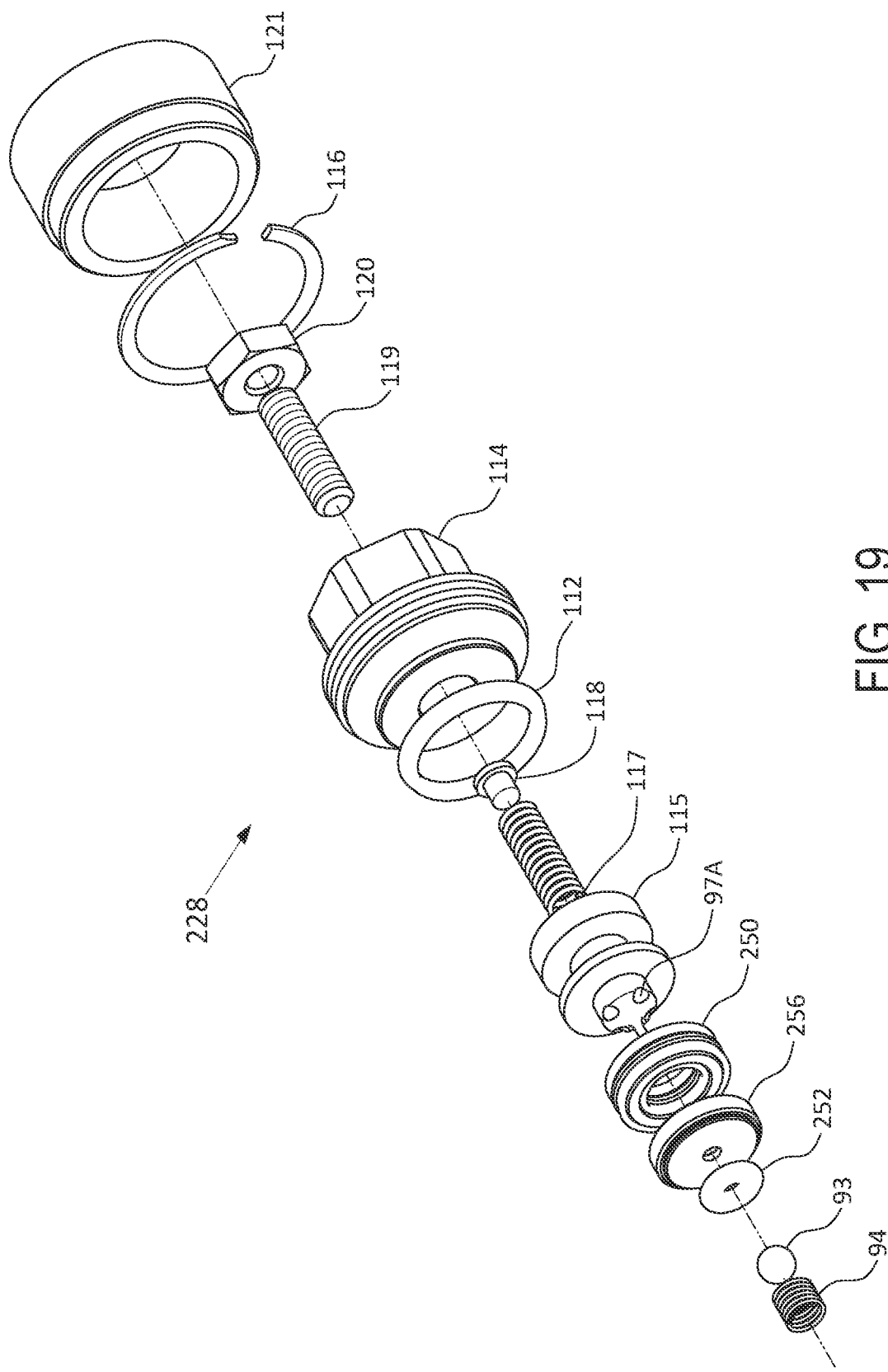
FIG. 19 is an assembly drawing of an embodiment of a regulator stage.
Figure 20:
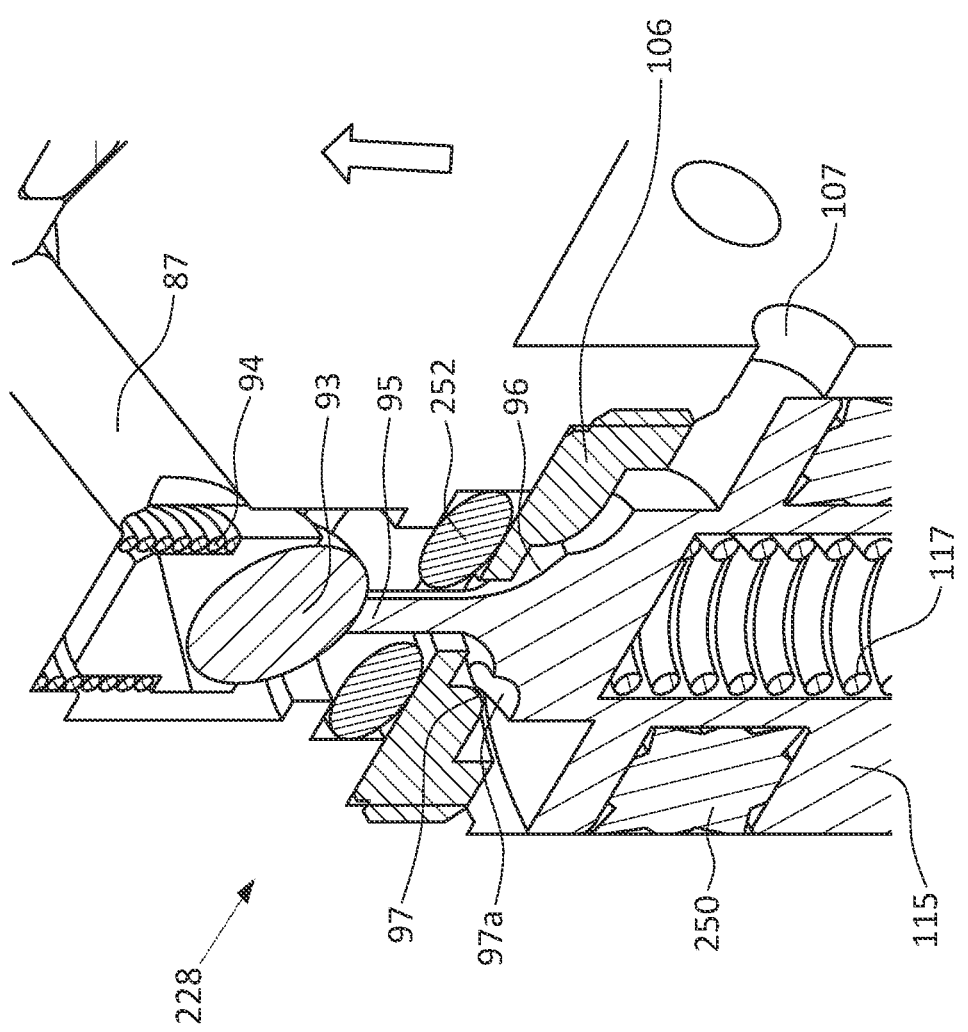
FIG. 20 is a detailed cross-sectional view of the embodiment of the regulator stage of FIG. 19.

FIG. 19 is an assembly view further illustrating regulator 228 also illustrated in FIG. 10. FIG. 20 is a cross-sectional view further illustrating regulator 228. As noted, third stage regulator 228 uses floating ball 93 that seals against O-ring 252's ID and is biased towards the closed position by spring 94. Piston 115 has a narrow tip 95 (FIG. 10, FIG. 20) that extends thru the O-ring 252's ID and pushes against ball 93 to force it open. As shown in the cross section of FIG. 20, piston 115 moves the ball relatively upwards (i.e., in the direction of the arrow) to increase the opening stroke and get more flow. In the maximum flow position the piston hits O-ring retainer 256 (i.e., the positive stop). However, that contact has the unwanted impact of limiting/stopping flow. In the embodiment, four scallops 97a are added to the piston's stop-face 96. Even when the piston is hard against the positive stop the scallops provide enough flow area for full flow to be maintained. This feature is needed when high flow rates are demanded at exceptionally low tank pressures (i.e., when large strokes are needed). Without scallops 97a, when piston 115 hits the full flow stop it also unfortunately stops the flow—when piston 115 has lifted flow-regulating-ball 93 to its maximum stroke, the flow is stopped "downstream" by piston stop-face 96 seating against seal retainer 256. Scallops 97a provide a full-flow path even though piston 115 is seated. This feature provides for a very high flow at low tank pressures, which is when the piston would normally be at such an extreme stroke.

Figure 21:
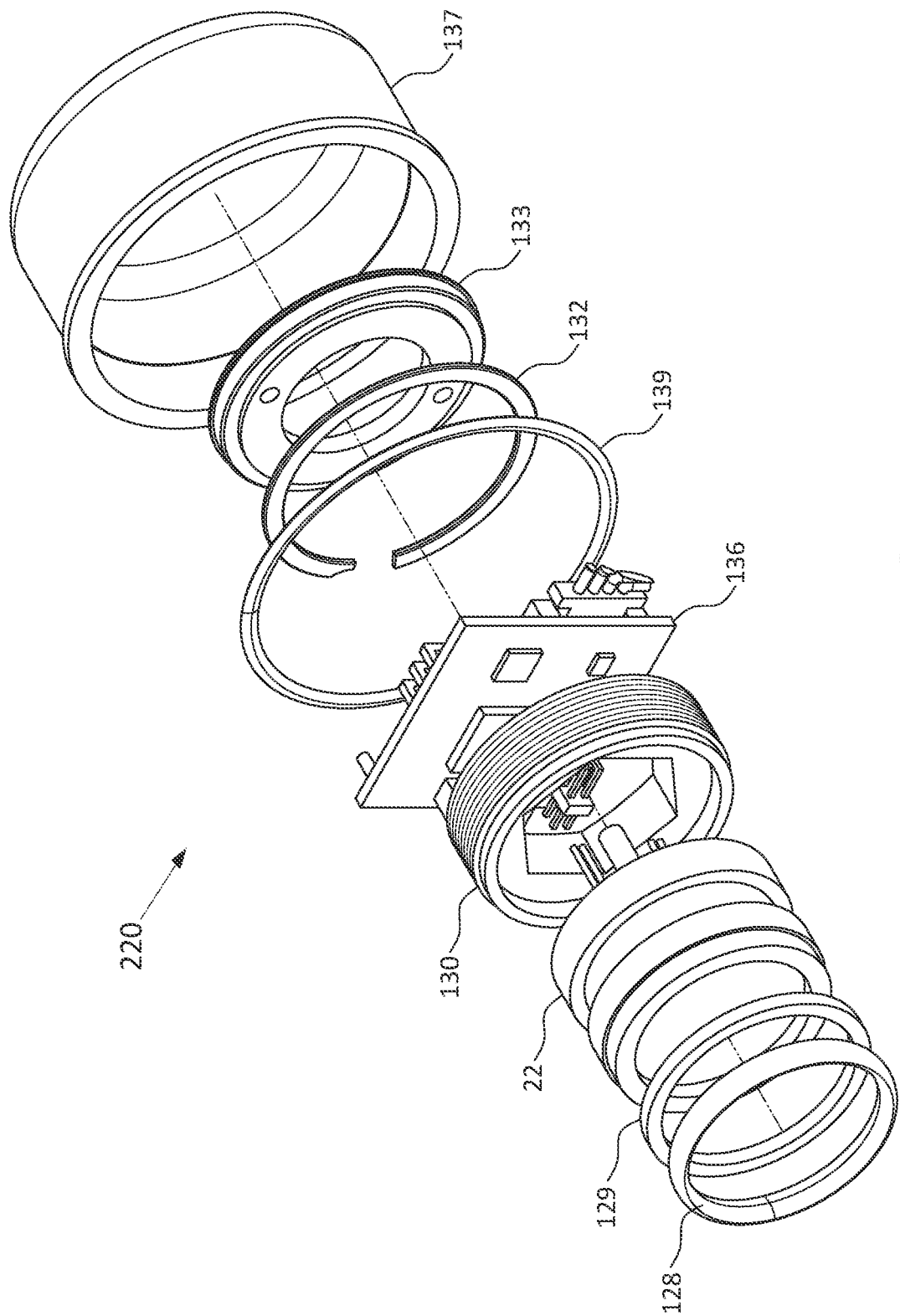
FIG. 21 is an assembly drawing of an embodiment of a pressure transducer.

FIG. 21 is an assembly view further illustrating aspects of high-pressure sensor 220. High-pressure sensor 220 provides the following features: it embeds the sensor deep in the body for abuse/impact tolerance; it eliminates a high-pressure leak site; the high-pressure seal is position sensitive instead of torque sensitive; and there is greater tamper resistance.

Typically, a stand-alone pressure sensor would simply be screwed into a port. This causes a number of issues. First, the sensor might protrude 1½'-3" from the port and be sealed by dry-seal tapered threads or an O-ring boss. The large protruding length would make the sensor vulnerable to impact or shear forces. If the sensor were compromised, the cylinder could be rapidly and uncontrollably vented and any part broken off could become a dangerous, high-velocity projectile. Second, the stand-alone sensor approach has two potential high pressure leaks sites: 1) sensor to housing; and 2) housing to port. Third, with the standalone sensor approach the sealing quality of the (B) housing to port seal is torque sensitive. That is true with both NPT studs and O-ring boss studs. The sealing integrity of those types may be potentially beached by thermal cycles, vibration, rapid pressure cycles or tampering. Any such beach is intolerable as the gas is flammable and any such leak would result in uncontrollable venting of the cylinder.

In embodiments, sensor 220 addresses these issues in the following ways. Regulator valve 100 embeds sensor 220 very deeply into the regulator body 2 eliminating any potential for shear. Thus, the assembly's safety and robustness are greatly increased. In addition, the typical standalone housing is eliminated by sensor 220 sealing directly to the regulator body, which eliminates the second potential leak site (housing to port seal). Sensor 220 employs a piston-style radial seal 128. Its sealing quality is only sensitive to position. Torque is not a factor in sealing. The axial force from gas pressure is absorbed by a threaded retainer 130. Threaded retainer 130 is doubly prevented from loosening. An internal retaining ring 132 prevents the retainer from loosening. A left-hand-threaded safety retainer 133 prevents the retaining ring from being removed and the retainer from loosening. Thus, the seals are kept in place preventing potential loosening from thermal cycles, vibration, or rapid pressure cycles.

Sensor 220 also discourages tampering. To tamper with the sensor, the domed pressure sensor cover would first have to be removed to expose the sensor sub-assembly parts. The sensor signal conditioning circuit board 136 could be moved aside, exposing the safety retainer. To tamper with the sensor, the safety retainer, internal retaining ring and sensor retainer would all have to be removed. However, the safety retainer 133 is turned by a custom pin wrench (note the two holes on opposing sides of the retainer), which would stop most tampering.

As shown in the cross-section of FIG. 12, sensor 220 is sealed to regulator body 2 by O-ring 128 (e.g., an SAE AS568A O-ring) and back-up ring 129. In the embodiment, both are elastomers. As the O-ring is an elastomer it will permeate hydrogen. Said permeation is sensitive to both pressure and temperature. Over time, even the best hydrogen compatible O-rings will permeate gas into the interior of domed pressure sensor cover 137. It is preferable that the gas should be periodically, safely vented, and not allowed to build up to unsafe pressures.

Thus, in embodiments, the interior of pressure sensor cover 137 is vented by a ball and spring type pressure relief valve—a PRV with elements 154, 155, 150 (FIG. 14). The orifice size is chosen so that an unsafe pressure cannot accumulate even if the sensor-seal failed. The spring force is chosen so that the relief occurs at a low pressure. That ensures that only small amounts of energy are released at a time. In the embodiment, for manufacturing efficiency, the relief-valve's ball 155 size is ⅛"; the same size as in manual valve 208 and first and second regulator stages 210, 212. The ball may be elastomeric (e.g., Nitrile) or plastic (e.g., PTFE, Delrin, Nylon).

In an embodiment, multiple features of regulator valve 100 enhance life expectancy and reliability. Section strengths are chosen so that fatigue is not an issue (i.e., infinite structural life). The overall design results in only two high pressure O-ring seals: 1) pressure sensor 220, and 2) manual valve stem. Both are be 0.070" cross section SAE AS568A O-rings and shaped back-up rings. Such seals have been previously proven to 875 bar (12700 psi) in hydrogen service. The pistons in each regulator stage have dynamic seals, such as multilobed seals (X-ring and multi-seals) that are chosen for low friction, long-life, and their ability to carry lubricant in their crevices. Thus, their use extends life over designs that use conventional O-rings. The combination of multi-lobed piston-seals and crest to crest wave springs results in lower spring forces being required. As a result, the potential for generating wear particles from piston motion is also reduced. The reduction of wear particles further extends both O-ring and ball seal life. All bores are anodized, reducing both friction and wear. Wear reduction is particularly notable as the impact of wear particles on hydrogen seals is important issue. The dynamic sealing format, throughout, is a ball seating against a sharp-edged orifice. That format has been shown to be reliable with long life expectancy. Ball materials are adjusted based on the sealing location to optimize life expectancy. For example, manual valve 208 and first regulator stage 210 are expected to see repetitive GED events and thus preferably use plastic balls. Second stage 212 operates at extremely low pressures and thus nitriles are preferred for their superior sealing ability. With third stage 228 the material selections are reversed: the seal is soft (nitrile) and the ball is hard (316 stainless).

In an embodiment, packaging is rectilinear with all basic features parallel or perpendicular to one another. This minimizes overall size to minimize mass. The result is a compact body (approximately 51 mm square) with high feature-density. All primary features except for pressure sensor 220 and PRD 222 are on a single plan (e.g., the regulator plane). That simplifies manufacturing. The plane of port 6 for PRD 222 is offset 1.59 mm to minimize overall width while increasing wall thicknesses. The pressure sensor plane is perpendicular to the regulator plane, also to minimize package size. The design allows a 2-wire (4-20 m-amp) or a 3-wire (0-5 vdc) pressure sensor 220. A bulkhead style connector would occupy too much space accordingly, a pigtail arrangement may be chosen in an embodiment. That results in two or three wires exiting the body and being externally terminated in a connector of the end-user's choice. The wires are environmentally sealed to the body by high volume automotive wire seals. The wire passages are connected to the interior of the pressure sensor cover and thus vented by the associated pressure relief valve. The embodiment may be attached to a high-pressure cylinder by an appropriate stud 3 (e.g., valve stem). For example, stud 3 may include O-ring seal 141 (boss face-seal style) with ⅝"-18 threads 140. Large studs can also be accommodated by simply enlarging the stud. As an example, an alternate stud is an M18×1.5 for cylinders with necks meeting UNI EN 144-1:2006.

In an embodiment, body 3 and most of the male parts are made from aluminum, minimizing both weight and cost. Commodity parts (screws, nuts, snap rings, springs) may be stainless steel and only use standard sizes. In the embodiment, only four small parts subject to high stresses are custom made, preferably from stainless steel: manual valve stem 49; third stage regulator piston 98; third stage seal retainer 256; and a spring adjuster disc 118 (FIG. 10).

The previous description is provided to enable any person skilled in the art to practice the various aspects described herein. In the embodiments, the separation of various system components in the embodiments described above should not be understood as requiring such separation in all embodiments. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A pressure regulator comprising:
   a first stage regulator, a second stage regulator, and a third stage regulator, wherein the first stage regulator is connected along a flow path between an inlet and the second stage regulator, the second stage regulator is connected along the flow path between the first stage regulator and the third stage regulator, and the third stage regulator is connected along the flow path between the second stage regulator and an outlet, and wherein a depression is defined on a piston of the third stage regulator, the depression configured to allow flow when the piston of the third stage regulator reaches a stop;
   a valve connected along the flow path between the first stage regulator and the inlet;
   a pressure relief device connected along the flow path upstream of the valve; and
   a pressure sensor connected along the flow path upstream of the valve.

2. The pressure regulator of claim 1 wherein:
   the first stage regulator comprises a first crest-to-crest wave-spring configured to set a first regulated pressure, and
   the second stage regulator comprises a second crest-to-crest wave-spring configured to set a second regulated pressure.

3. The pressure regulator of claim 2, wherein a third regulated pressure of the third stage regulator is adjustable.

4. The pressure regulator of claim 1, wherein the pressure sensor comprises a transducer.

5. The pressure regulator of claim 4, comprising:
   a first threaded retainer configured to retain the transducer of the pressure sensor in a body of the pressure regulator,
   a retaining ring configured to inhibit removal of the first threaded retainer, and
   a second threaded retainer configured to inhibit removal of the retaining ring, the second threaded retainer being threaded opposite the direction of threading of the first threaded retainer.

6. The pressure regulator of claim 5, wherein the center axis of the first stage regulator, the center axis of the second stage regulator, and the center axis of the valve are parallel and wherein the center axis of the third stage regulator is perpendicular to the center axis of the first stage regulator.

7. The pressure regulator of claim 6, wherein the valve includes a ball and a seat.

8. The pressure regulator of claim 7, wherein the valve is configured to be changed from an on position to an off position with less than a half-turn of a stem.

9. The pressure regulator of claim 1, wherein the first, the second, and the third stage regulator are at least partially disposed in a body of the pressure regulator.

10. The pressure regulator of claim 1, wherein a center axis of the first stage regulator, a center axis of the second stage regulator, a center axis of the third stage regulator, and a center axis of the valve lie in a common plane.

11. The pressure regulator of claim 10, wherein the common plane is orthogonal to a center axis of a mounting stud of a body of the pressure regulator, wherein the mounting stud defines a regulator inlet connected to the flow path.

12. The pressure regulator of claim 1, wherein the pressure relief device is a thermal pressure relief device.

13. The pressure regulator of claim 1 in which the flow path is a first flow path, and comprising a filling port fluidically connected to a second flow path independent of the first flow path, wherein the second flow path is disposed in an annular area about the pressure sensor.

14. The pressure regulator of claim 13, wherein both the first and the second flow paths pass through a mounting stud of a body of the pressure regulator, wherein the mounting stud defines a regulator inlet connected to the first flow path.

15. The pressure regulator of claim 14 comprising a drive socket disposed on a body of the pressure regulator, a center axis of the drive socket oriented in parallel with a center axis of a mounting stud of the body.

16. The pressure regulator of claim 1, wherein the first, second, and third stage regulators are configured to deliver to the outlet a regulated pressure of from 10-20 psi from a tank pressure of from 50 to 6,000 psi.

17. The pressure regulator of claim 1 comprising a pressure relief valve fluidically connected to the flow path between the valve and the third stage regulator.

18. The pressure regulator of claim 17, wherein the pressure relief valve is fluidically connected to a first regulated pressure provided by the first stage regulator.

* * * * *